US012305537B2

(12) United States Patent
Carle et al.

(10) Patent No.: US 12,305,537 B2
(45) Date of Patent: May 20, 2025

(54) VANE ASSEMBLY FOR OPEN FAN ENGINE

(71) Applicant: General Electric Company, Schenectady, NY (US)

(72) Inventors: Sara Elizabeth Carle, Columbus, OH (US); Daniel L. Tweedt, West Chester, OH (US); Syed Arif Khalid, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/230,611

(22) Filed: Aug. 4, 2023

(65) Prior Publication Data

US 2025/0043688 A1 Feb. 6, 2025

(51) Int. Cl.
*F01D 9/04* (2006.01)
*F01D 5/14* (2006.01)

(52) U.S. Cl.
CPC ............. *F01D 9/041* (2013.01); *F01D 5/141* (2013.01); *F01D 5/148* (2013.01); *F05D 2220/36* (2013.01)

(58) Field of Classification Search
CPC .......... F01D 9/041; F01D 5/141; F01D 5/148; F05D 2220/36
See application file for complete search history.

(56) References Cited

U.S. PATENT DOCUMENTS 4,657,484 A 4/1987 Wakeman
4,784,575 A * 11/1988 Nelson .................... B64C 11/20 416/DIG. 2
4,927,329 A 5/1990 Kliman
5,023,793 A 6/1991 Schneider
9,242,721 B2 1/2016 Neuteboom
9,376,202 B2 6/2016 Szymandera
9,771,878 B2 9/2017 Lu
10,414,486 B2 * 9/2019 Wood .................... F04D 29/324
10,669,881 B2 6/2020 Breeze-Stringfellow (Continued)

FOREIGN PATENT DOCUMENTS

FR 3127024 3/2023
FR 3127025 3/2023

(Continued)

OTHER PUBLICATIONS https://aerocorner.com/aircraft/antonov-an-70/#lg=1&slide=5; 1 pg.

(Continued)

*Primary Examiner* — Brian Christopher Delrue
(74) *Attorney, Agent, or Firm* — Fitch, Even, Tabin & Flannery LLP

(57) ABSTRACT

The present disclosure is generally related to a vane assembly for an open fan engine having a rotor and a stator. The vane assembly is a plurality of vanes each arranged about the stator. Each of the vanes of the vane assembly has a leading edge (LE) with a leading edge angle (LEA). A combination of aircraft angle of attack, sideslip, and upwash due to lifting bodies can create a flow angularity into the engine. The leading edge angle (LEA) of each of the vanes varies depending upon the circumferential location about the stator so that the impact on the flow angularity into the engine is reduced or increased in different circumferential regions.

22 Claims, 16 Drawing Sheets

(56) References Cited

U.S. PATENT DOCUMENTS

| | | | | |
|---|---|---|---|---|
| 11,300,003 | B2 * | 4/2022 | Breeze-Stringfellow | F01D 9/041 |
| 11,572,827 | B1 * | 2/2023 | Khalid | F02C 3/067 |
| 2011/0044796 | A1 * | 2/2011 | Hussain | B64C 23/065 415/115 |
| 2011/0202321 | A1 * | 8/2011 | Lung | F04D 27/001 703/1 |
| 2015/0315915 | A1 * | 11/2015 | Vlastuin | B64C 11/18 416/223 R |
| 2016/0010487 | A1 * | 1/2016 | Breeze-Stringfellow | B64C 11/001 415/208.1 |
| 2016/0368592 | A1 | 12/2016 | Szymandera | |
| 2021/0270137 | A1 * | 9/2021 | Sozio | F01D 5/145 |
| 2023/0265862 | A1 * | 8/2023 | Sibbach | F01D 25/24 415/208.2 |
| 2024/0051656 | A1 * | 2/2024 | Zutshi | B64C 13/24 |

FOREIGN PATENT DOCUMENTS

| | | | |
|---|---|---|---|
| FR | 3127269 | 3/2023 | |
| FR | 3129375 | 5/2023 | |
| FR | 3129428 | 5/2023 | |
| FR | 3129432 | 5/2023 | |
| FR | 3129436 | 5/2023 | |
| FR | 3129690 | 6/2023 | |
| FR | 3129970 | 6/2023 | |
| FR | 3129972 | 6/2023 | |
| FR | 3130313 | 6/2023 | |
| FR | 3130323 | 6/2023 | |
| FR | 3130747 | 6/2023 | |
| FR | 3130874 | 6/2023 | |
| FR | 3130875 | 6/2023 | |
| FR | 3130877 | 6/2023 | |
| FR | 3130879 | 6/2023 | |
| FR | 3130894 | 6/2023 | |
| FR | 3130895 | 6/2023 | |
| FR | 3130896 | 6/2023 | |
| FR | 3130897 | 6/2023 | |
| FR | 3132279 | 8/2023 | |
| FR | 3132729 | 8/2023 | |
| FR | 3132743 | 8/2023 | |
| FR | 3133367 | 9/2023 | |
| FR | 3133368 | 9/2023 | |
| WO | WO-2014066503 A1 * | 5/2014 | B64C 11/00 |

OTHER PUBLICATIONS

Airbus A400M strategic turboprop freighter programme; Oct. 26, 2017, 9 pgs; https://www.armadainternational.com/2017/10/airbus-a400m-strategic-turboprop-freighter-programme/.

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

Attariwala, Joetey; "Coming to a Theatre near You"; published Feb./Mar. 2016 Issue (Oct. 26, 2017); https://www.armadainternational.com/2017/10/airbus-a400m-strategic-turboprop-freighter-programme/; 9 pgs.

* cited by examiner $$L_2 > L_1$$
$$\beta_2 < \beta_1$$

VANE ASSEMBLY FOR OPEN FAN ENGINE

FIELD

This application is generally directed to a vane assembly for an open fan engine.

BACKGROUND

In one form, winged aircraft have propulsors, such as unducted, open fan gas turbine engines. Gas turbine engines may employ an unducted, open fan design. A turbofan engine operates on the principle that a central gas turbine core drives a bypass fan, the bypass fan being disposed between a nacelle of the engine and an engine core. In contrast, an unducted, open fan gas turbine engine instead operates on the principle of having the bypass fan located outside of the engine nacelle. This permits the use of larger fan blades able to act upon a larger volume of air than for a turbofan engine, and can thereby improve propulsive efficiency over conventional engine designs.

The turbine engines can have blades arranged in a forward array and vanes arranged in a rearward array. The blades of the forward array are mounted on a rotating element in the form of a rotatable propellor assembly. The vanes of the rearward array are mounted on a non-rotating stationary element.

BRIEF DESCRIPTION OF THE DRAWINGS

Various needs are at least partially met through provision of a vane assembly for an open fan engine as described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
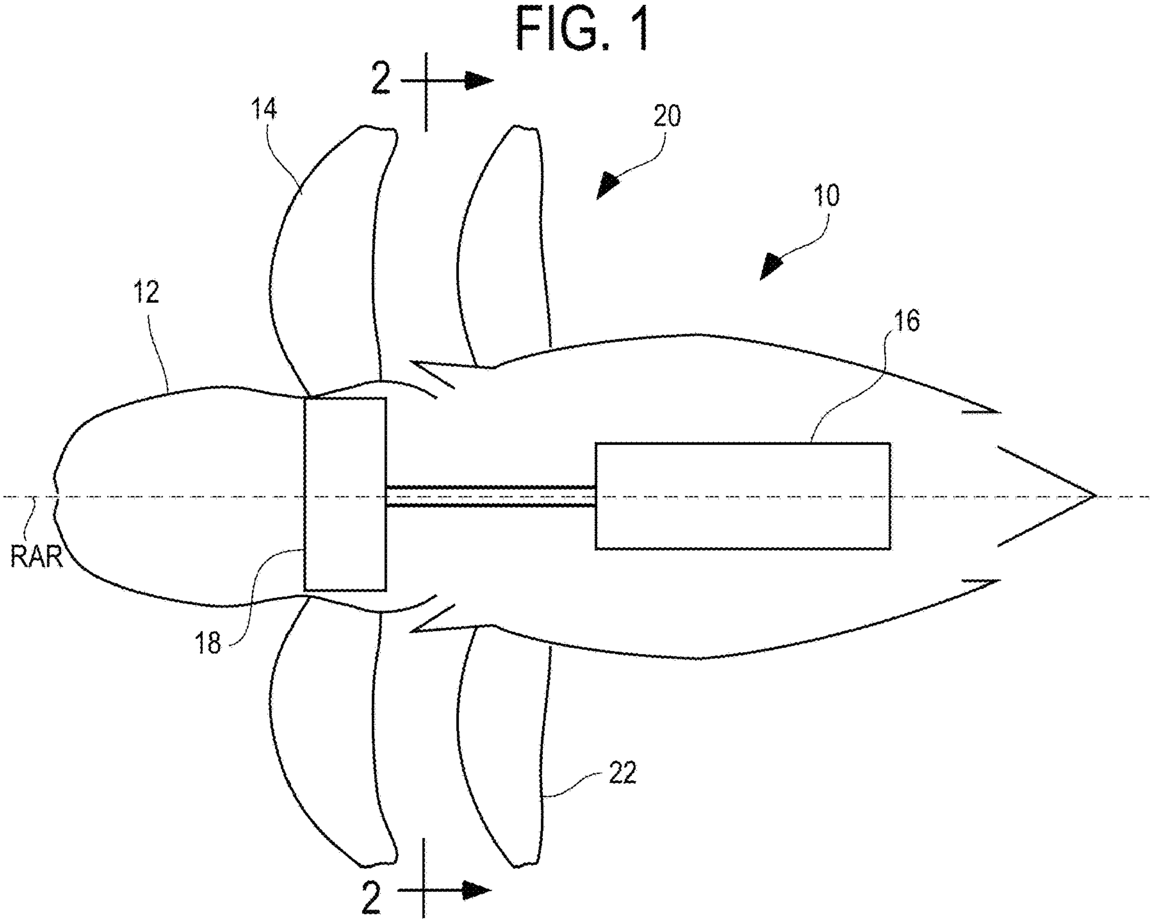
FIG. 1 depicts an elevational cross-sectional view of an exemplary open fan engine having a plurality of blades arranged in a forward array and a plurality of vanes arranged in a rearward array or assembly.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The terms and expressions used herein have the ordinary technical meaning as is accorded to such terms and expressions by persons skilled in the technical field as set forth above except where different specific meanings have otherwise been set forth herein.

The word "or" when used herein shall be interpreted as having a disjunctive construction rather than a conjunctive construction unless otherwise specifically indicated.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "clockwise" and "counter-clockwise" refer to the relative direction of rotation that is viewed from forward looking aft.

For a rotating propeller blade, a surface of the blade on an advancing side thereof, due to rotation, can be referred to as the pressure surface. A surface on the retreating side of the blade, due to rotation, can be referred to as a suction surface. The leading edge of a propeller blade is used herein to refer to a three-dimensional curve at which the suction surface and pressure surface meet on an upstream edge of the blade, based on the flight direction. A trailing edge refers to an intersection of the same suction surface and pressure surface on the downstream edge of the blade. The mean surface is used herein to refer to the imaginary surface connecting the leading edge to trailing edge, which lies between the pressure surface and suction surface. The leading and trailing edges for a stationary vane are defined in the same way as for the rotating blade, with the vane suction and pressures sides being reversed from those of the blade.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The term "sideslip" refers to the flow direction angle relative to a plane that passes through the axis of rotation of the rotor and the vertical direction. An aircraft may operate in a condition where the aircraft is rotated in the yaw direction relative to the direction of flight. This will create a sideslip angle relative to the engine which will be seen as a horizontal component of flow entering the rotor inlet.

The term "disk area" refers to an imaginary annular planar surface that is normal to and centered about the axis of rotation of the rotor. In the axial direction the planar surface is aligned to the most forward location of a rotor or vane. The annulus outer and inner radii correspond to the maximum and minimum radii of the rotor or vane relative to the axis of rotation of the rotor.

The term "V1" refers to a vector of unit magnitude and represents the average flow direction integrated over the disk area of the intended rotor location as it would be positioned on an aircraft but without the effects of the engine on the flow for a given flight condition. In one aspect, the term "V1" can be simplified to be a vector of unit magnitude aligned to the flight direction extending from upstream to downstream.

The term "V2" refers to a vector of unit magnitude and represents the rotor axis of rotation RAR of the open fan engine, where the direction depends on the rotation direction of the rotor. For clockwise forward looking aft (FLA) rotor rotation, V2 extends from forward to aft along the rotor axis of rotation RAR and for counter-clockwise FLA rotor rotation V2 extends from aft to forward along the rotor axis of rotation RAR.

The term "flow separation," also known as boundary layer separation, as used herein, refers to the detachment of a boundary layer of the flow from a surface of an airfoil, e.g., a vane.

In the case of unducted, open fan gas turbine engines, the flow entering the vanes is less uniform than for ducted engines. Furthermore, the impact of the vanes can vary depending upon differences in angle of attack, such as cruise versus take-off angles of attack.

The present disclosure is generally related to a vane assembly for an open fan engine having a rotor and stator. The stator includes a vane assembly with a plurality of vanes. Each of the vanes of the vane assembly has a leading edge (LE) with a leading edge angle (LEA). A combination of aircraft angle of attack, sideslip, and upwash due to lifting bodies can create a flow angularity into the engine, where this flow angularity would vary for different flight conditions. This flow angularity translates to a circumferential variation, or distortion, in the flow field entering the stationary vane row. The conventional approach would be to configure the vanes to operate efficiently or with little flow separation at a design point (e.g. cruise) where there is very little or no flow angularity. At high flow angularities, the vanes configured for a design point can have increased losses due to distortion in the flow entering the vanes. It would be useful if there were a way to also achieve high performance at high flow angularity.

The description herein describes how the leading edge angles of the vanes can vary depending upon the circumferential location about the engine. The circumferential variation in leading edge angle (LEA) could provide aircraft system benefits and efficiency, such as maintaining thrust at takeoff, reduced fuel burn over the mission, reduced aeromechanics risk, and/or reduced noise generation.

Figure 2:
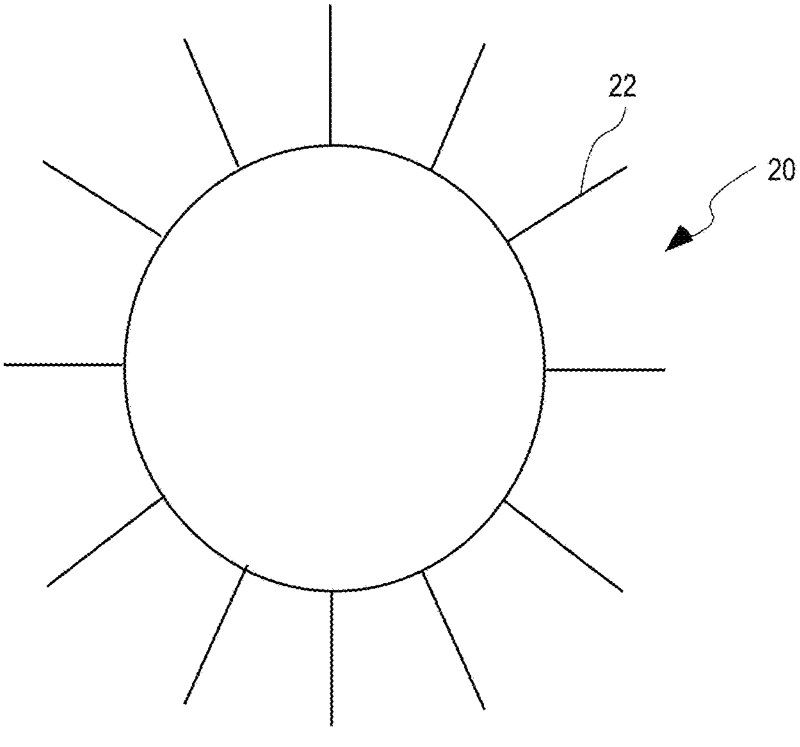
FIG. 2 depicts a front elevation view of the rearward array of vanes taken from line 2-2 of FIG. 1, simplified to omit internal details of the open fan engine.

FIG. 1 shows an elevational cross-sectional view of an exemplary embodiment of an unducted fan propulsor or engine 10. As is seen from FIG. 1, the unducted fan propulsor 10 takes the form of an open rotor propulsion system and has a rotating element in the form of rotatable propeller assembly or rotor 12 on which is circumferentially mounted a first array of blades 14 around a rotor axis of rotation RAR, which is also the axial centerline in this example, of the unducted fan propulsor 10. The unducted fan propulsor 10 also includes a non-rotating stationary element, vane assembly 20, which includes an array of circumferentially mounted vanes 22 also disposed around the rotor axis of rotation RAR, as shown in FIG. 2. The number of vanes 22 of the vane assembly 20 can vary. For example, the number of vanes can be 12 as shown, or more (e.g., 16) or less (e.g., 8), or between 8 and 16.

As shown in FIG. 1, the exemplary unducted fan propulsor 10 includes a drive mechanism 16 which provides torque and power to the propeller assembly 12 through a transmission 18. In various embodiments, the drive mechanism 16 may be a gas turbine engine, an electric motor, an internal combustion engine, or any other suitable source of torque and power and may be located in proximity to the propeller assembly 12 or may be remotely located with a suitably configured transmission 18. Transmission 18 transfers power and torque from the drive mechanism 16 to the propeller assembly 12 and may include one or more shafts, gearboxes, or other mechanical or fluid drive systems.

Figure 17:
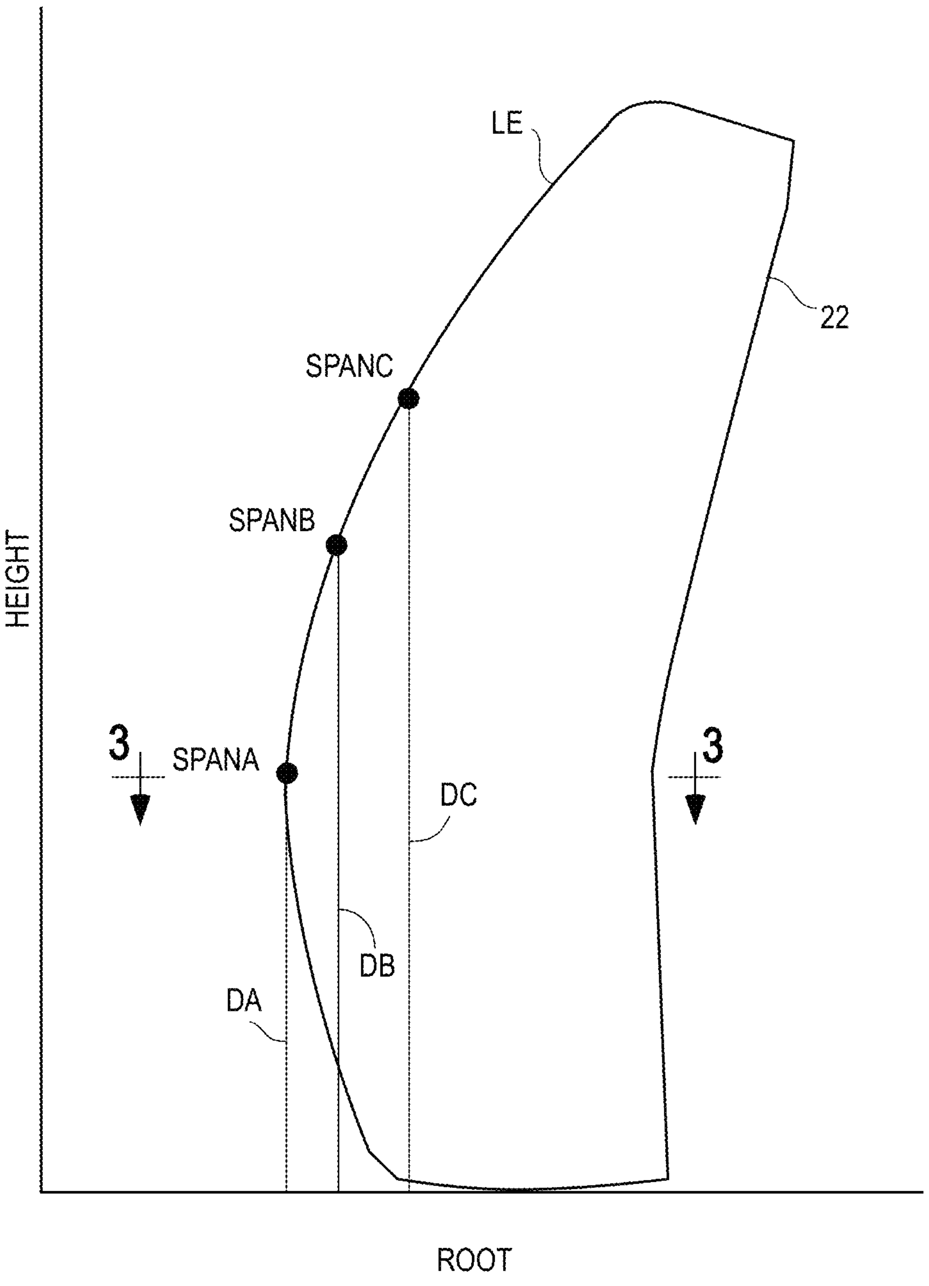
FIG. 17 is a schematic side elevation view of an exemplary vane suitable for use with the vane assembly described herein.

A vane 22 of the vane assembly 20 of FIG. 1 has a leading edge (LE) and a height, as shown in detail in FIG. 17, which can be measured from the root of the vane 22 to the tip. Points along the height of the vane 22 can be identified as different spans. For example, and as shown in FIG. 17, there can be a multitude of spans along the leading edge (LE), e.g., SPANA at a first distance DA from the root, a SPANB at a second distance DB from the root and a SPANC at a third distance DC from the root. For example, the spans can be within regions than include 0-50 or 50-100 percent of vane height as measured from the root of the vane 22 to the tip, in other words, lower half or upper half, or, for example, 10-90, 20-80, 30-70, 40-60 percent of the vane height as measured from the root of the vane 22 to the tip, or just a single span that meets the criteria. There can be many different spans identified. Such variation in leading edge angle (LEA) could be particularly beneficial over certain ranges of the vane height depending upon vane and other design factors, such as where those ranges can vary around the circumference. The purpose of identifying a given span is to identify a common point of measurement for the leading edge angle (LEA) among different vanes 22 of the vane assembly 20.

Figure 3:
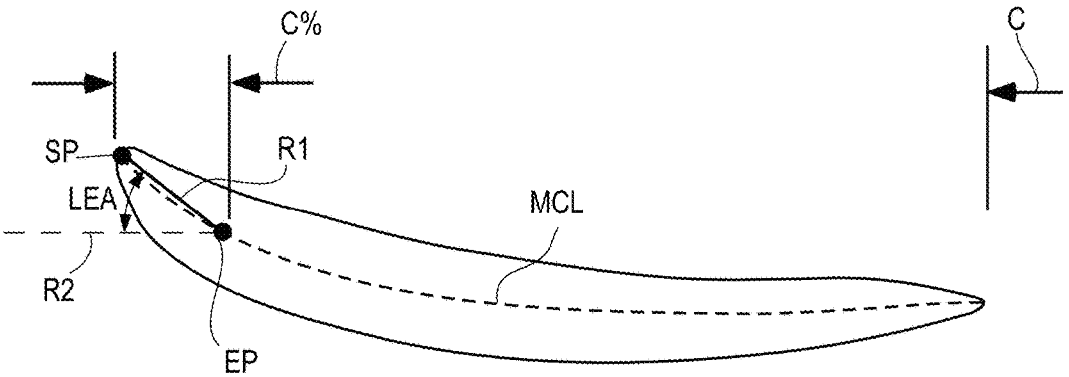
FIG. 3 is a cross-section view of a vane of the rearward array, taken along line 3-3 of FIG. 17, showing a mean camber line (MCL) and a leading edge angle (LEA) for an open fan engine with the blades of the forward array arranged for clockwise rotation.
Figure 4:
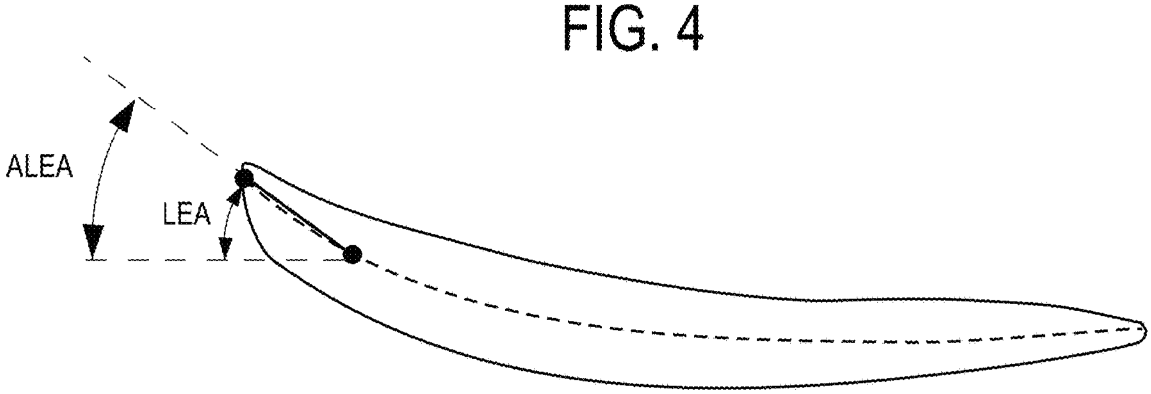
FIG. 4 is a cross-section view of a vane of the rearward array, similar to that of FIG. 3, but showing the leading edge angle (LEA) being the same as an average leading edge angle (ALEA)
Figure 5:
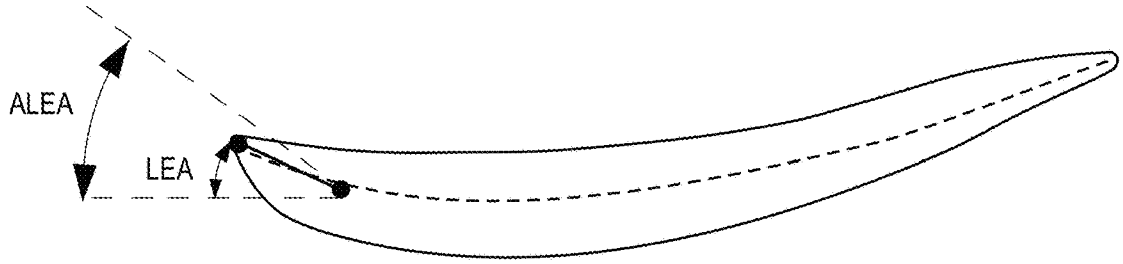
FIG. 5 is a cross-section view of a vane of the rearward array, similar to that of FIG. 3 but showing an example of a leading edge angle (LEA) being less than the average leading edge angle (ALEA) and achieved by varying the stagger of the blade.
Figure 6:
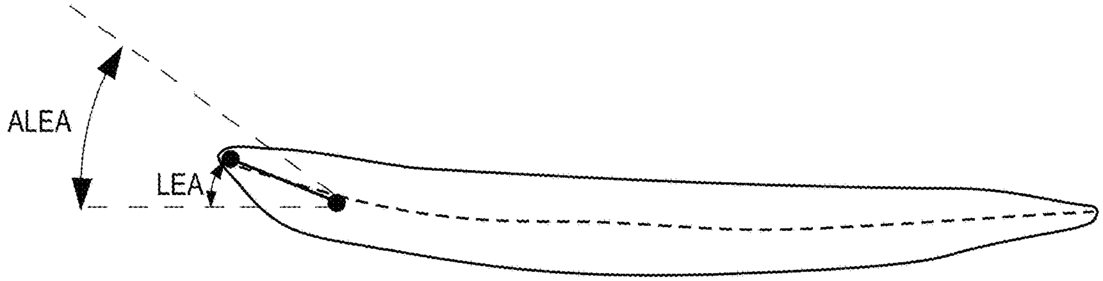
FIG. 6 is a cross-section view of a vane of the rearward array, similar to that of FIG. 3 but showing an example of a leading edge angle (LEA) being less than the average leading edge angle (ALEA) and achieved by varying the camber of the blade.
Figure 7:
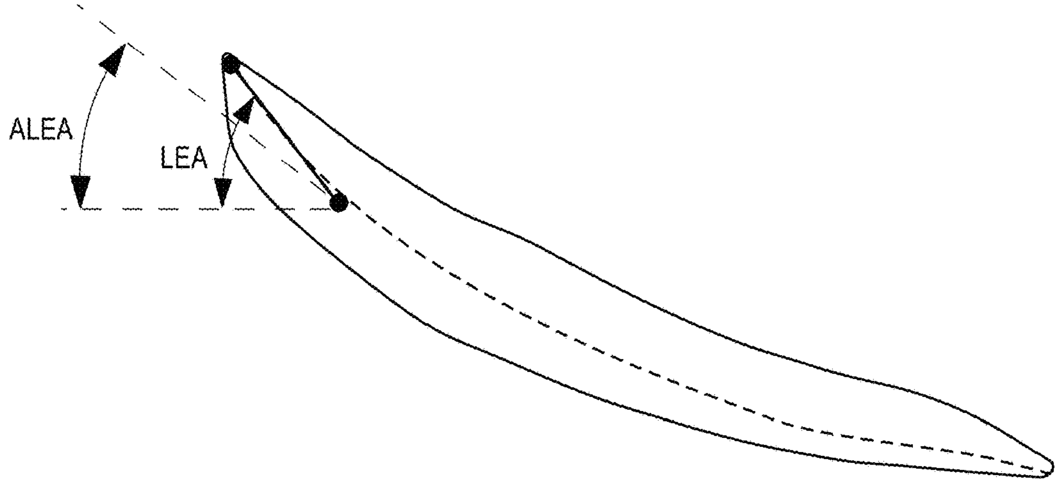
FIG. 7 is a cross-section view of a vane of the rearward array, similar to that of FIG. 3 but showing an example of a leading edge angle (LEA) being greater than the average leading edge angle (ALEA) and achieved by varying the stagger of the blade.
Figure 8:
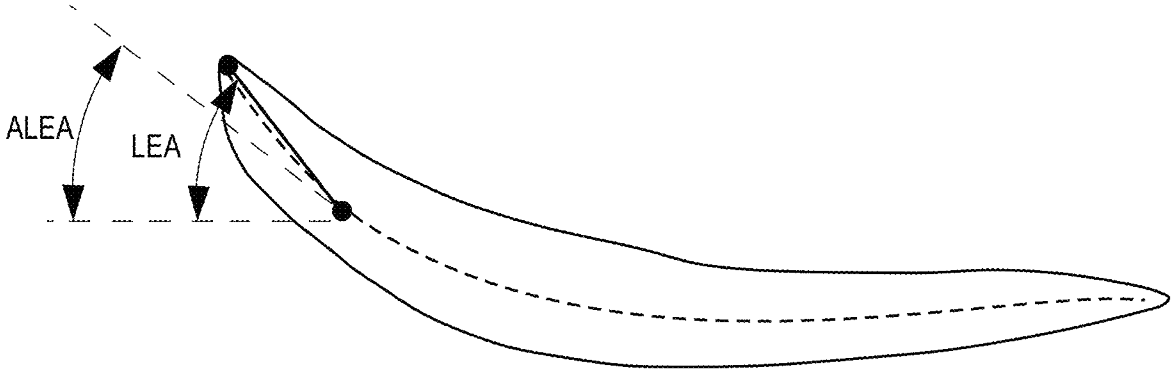
FIG. 8 is a cross-section view of a vane of the rearward array, similar to that of FIG. 3 but showing an example of a leading edge angle (LEA) being greater than the average leading edge angle (ALEA) and achieved by varying the camber of the blade.
Figure 9:
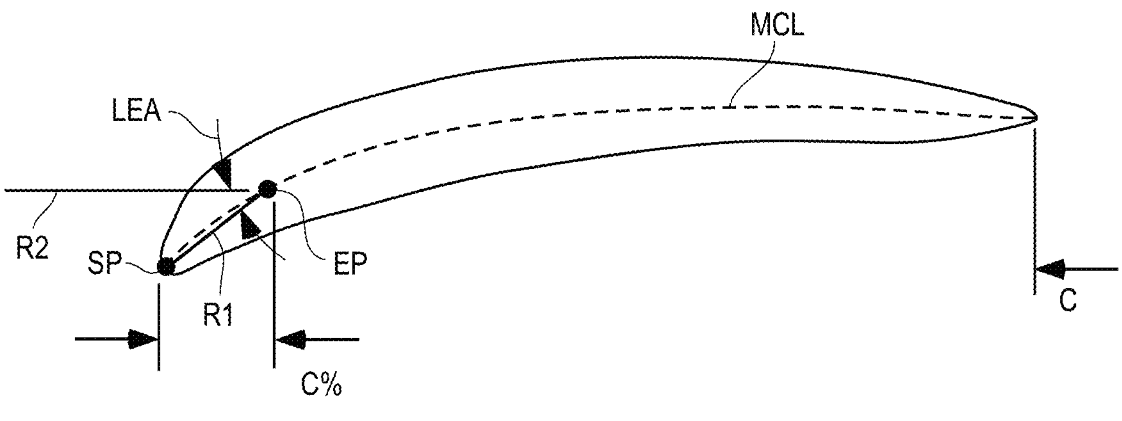
FIG. 9 is a cross-section view of a vane of the rearward array, showing a mean camber line and a leading edge angle for an open fan engine with the blades of the forward array arranged for counter-clockwise rotation.
Figure 10:
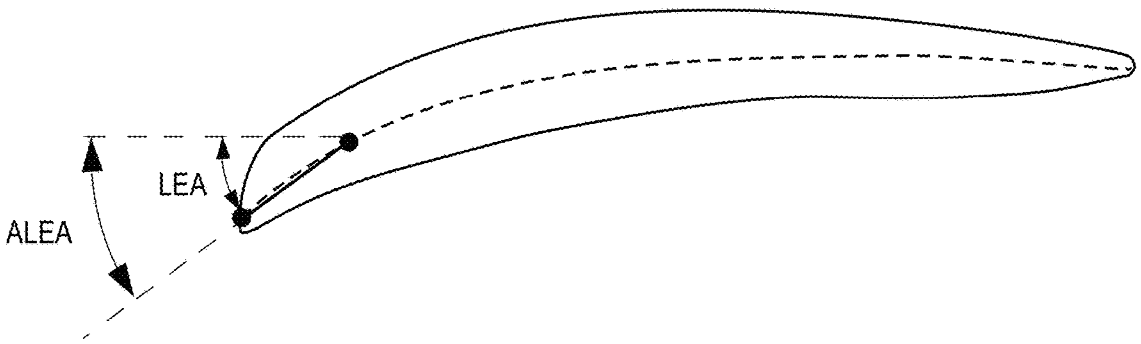
FIG. 10 is a cross-section view of a vane of the rearward array, similar to that of FIG. 9 but showing the leading edge angle (LEA) being the same as an average leading edge angle (ALEA)
Figure 11:
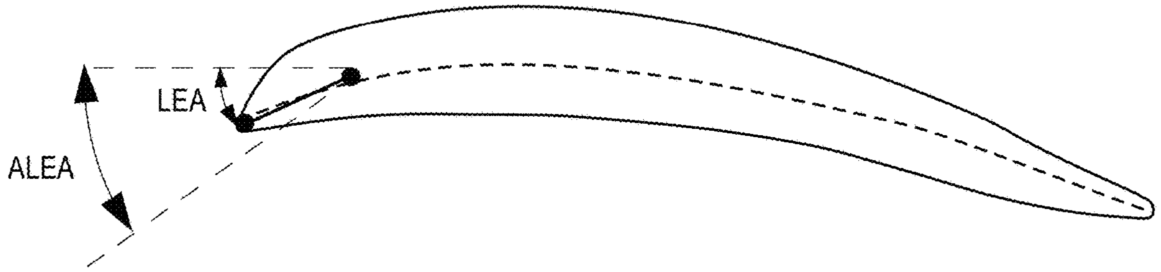
FIG. 11 is a cross-section view of a vane of the rearward array, similar to that of FIG. 9 but showing an example of a leading edge angle (LEA) being less than the average leading edge angle (ALEA) and achieved by varying the stagger of the blade.
Figure 12:
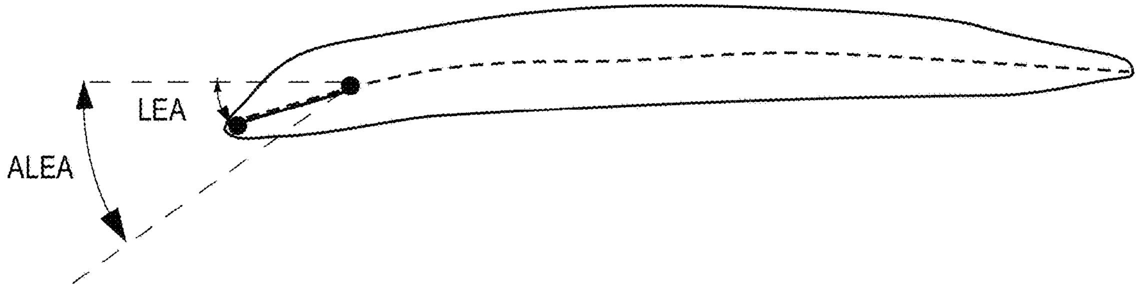
FIG. 12 is a cross-section view of a vane of the rearward array, similar to that of FIG. 9 but showing an example of a leading edge angle (LEA) being less than the average leading edge angle (ALEA) and achieved by varying the camber of the blade.
Figure 13:
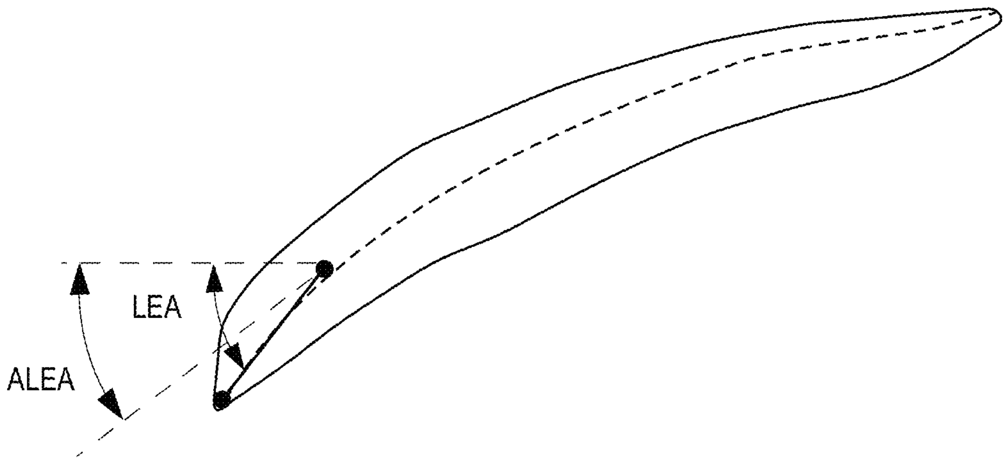
FIG. 13 is a cross-section view of a vane of the rearward array, similar to that of FIG. 9 but showing an example of a leading edge angle (LEA) being greater than the average leading edge angle (ALEA) and achieved by varying the stagger of the blade.
Figure 14:
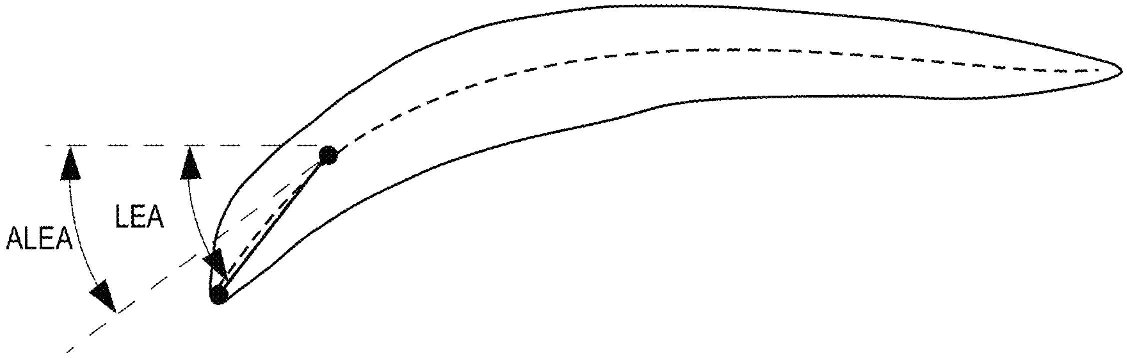
FIG. 14 is a cross-section view of a vane of the rearward array, similar to that of FIG. 9 but showing an example of a leading edge angle (LEA) being greater than the average leading edge angle (ALEA) and achieved by varying the camber of the blade.

Once a given span is identified, e.g., SPANA, SPANB, SPANC, etc., a comparison of the leading edge angle (LEA) for each of the different vanes 22 of the vane assembly 20 can be made. The leading edge angle (LEA) for a given vane 22 is measured between a first reference line (R1) and a second reference line (R2) at the chosen span, as shown in FIGS. 3 and 9. The first reference line (R1) has a starting point (SP) at the leading edge (LE) of the vane 22 and an ending point (EP) along a mean camber line (MCL) of the vane 22 and at a specific chord length percent (C %) from the leading edge (LE), as shown in FIG. 3 for clockwise rotation of the rotor 12 and FIG. 9 for counter-clockwise rotation of the rotor 12. The specific chord length percent (C %) can be a percent of the total chord length (C) of the vane 22 as measured from the leading edge (LE). For example, the chord length percent (C %) can be 2%, 3%, 5%, or up to 15% of the total chord length (C) of the vane 22. The second reference line (R2) extends forward, from the ending point (EP) of the first reference line (R1) and in a direction toward the leading edge (LE) and parallel to the axis of rotation, as shown in FIG. 3 for clockwise rotation of the rotor 12 and FIG. 9 for counter-clockwise rotation of the rotor 12. The leading edge angle (LEA) can be calculated at any given condition in the case where vanes are subject to re-staggering during operation or otherwise.

The leading edge angle (LEA) for each of the vanes 22 of the vane assembly 20 can be averaged to determine an average leading edge angle (ALEA). The variation or delta in leading edge angle (DLEA), for a given one of the vanes 22 as compared to the average leading edge angle (ALEA) can be determined. If all of the vanes 22 are identical and identically arranged, then each one would have a delta in leading edge angle (DLEA) of zero. However, as discussed above, there are benefits in efficiency that can be achieved by varying the DLEA of the vanes 22 about the circumference of the vane assembly 20.

The position of a given vane 22 about the circumference of the vane assembly 20 can be measured at a different circumferential location θ, where θ is measured relative to a circumferential positioning vector (CPV) defined as the cross-product of two vectors, V1×V2, and θ increases in the direction of rotor rotation.

Figure 18:
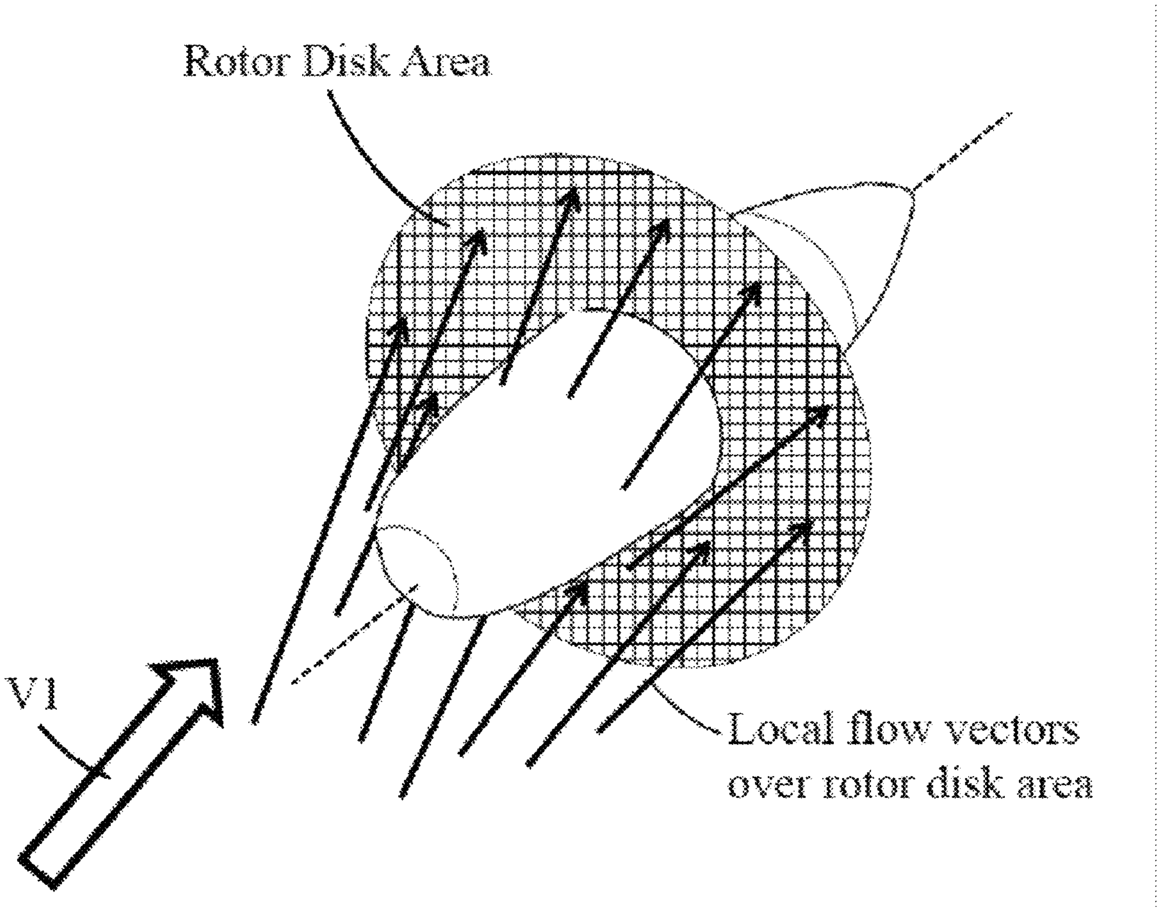
FIG. 18 is a schematic perspective view of an open fan engine with a rotor disk area added for reference and showing multiple exemplary local flow vectors over the rotor disk area.
Figure 19:
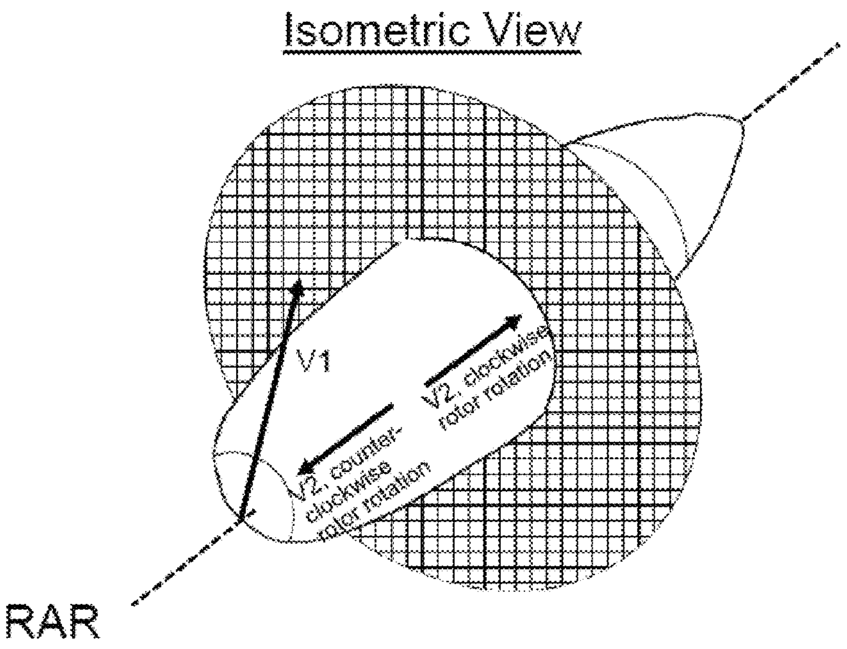
FIG. 19 is a schematic perspective view of an open fan engine with a rotor disk area added for reference and showing a vector V1 with an upward flow component and showing the directions of a vector V2 for clockwise rotation and counter-clockwise rotation.
Figure 20:
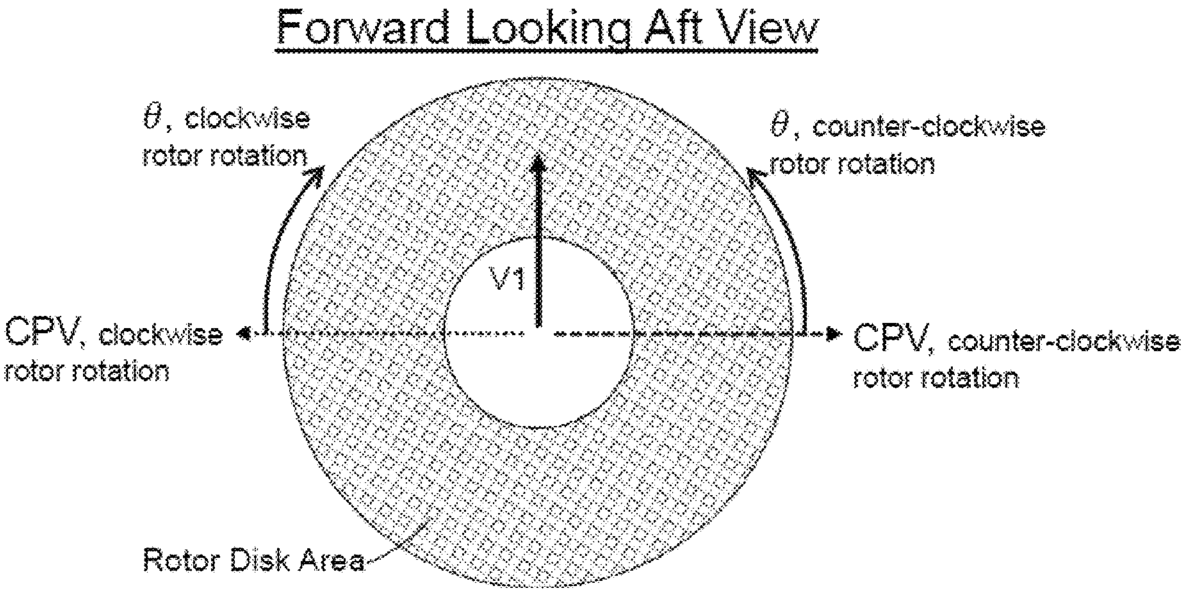
FIG. 20 is a forward-looking-aft view of the open fan engine of FIG. 19 showing the circumferential positioning vector (CPV) for clockwise and counter-clockwise rotor rotation based on V1.
Figure 21:
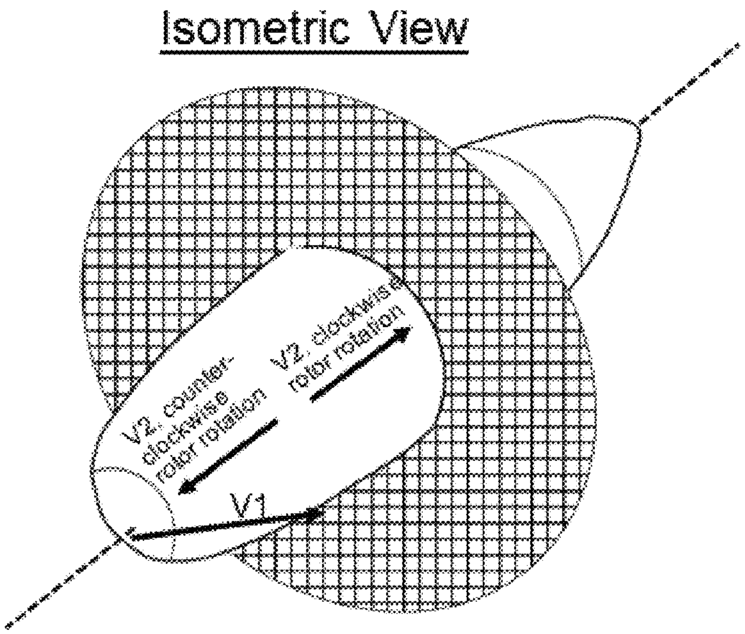
FIG. 21 is a schematic perspective view of the open fan engine with the rotor disk area added for reference and showing a vector V1 with a left-to-right forward-looking-aft flow component and showing the directions of a vector V2 for clockwise rotation and counter-clockwise rotation.
Figure 22:
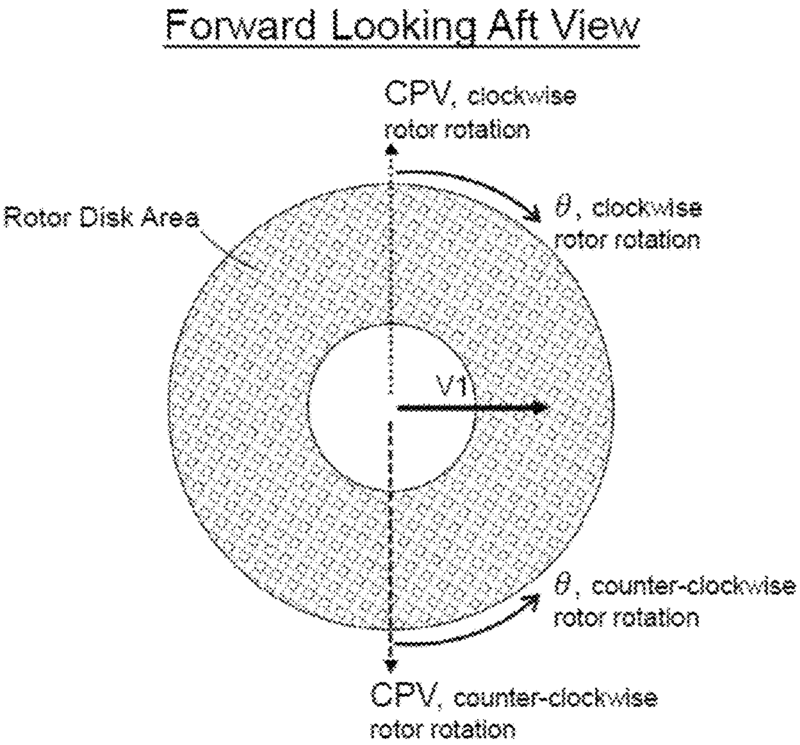
FIG. 22 is a forward-looking-aft view of the open fan engine of FIG. 20 showing the circumferential positioning vector (CPV) for clockwise and counter-clockwise rotor rotation based on V1.
Figure 23:
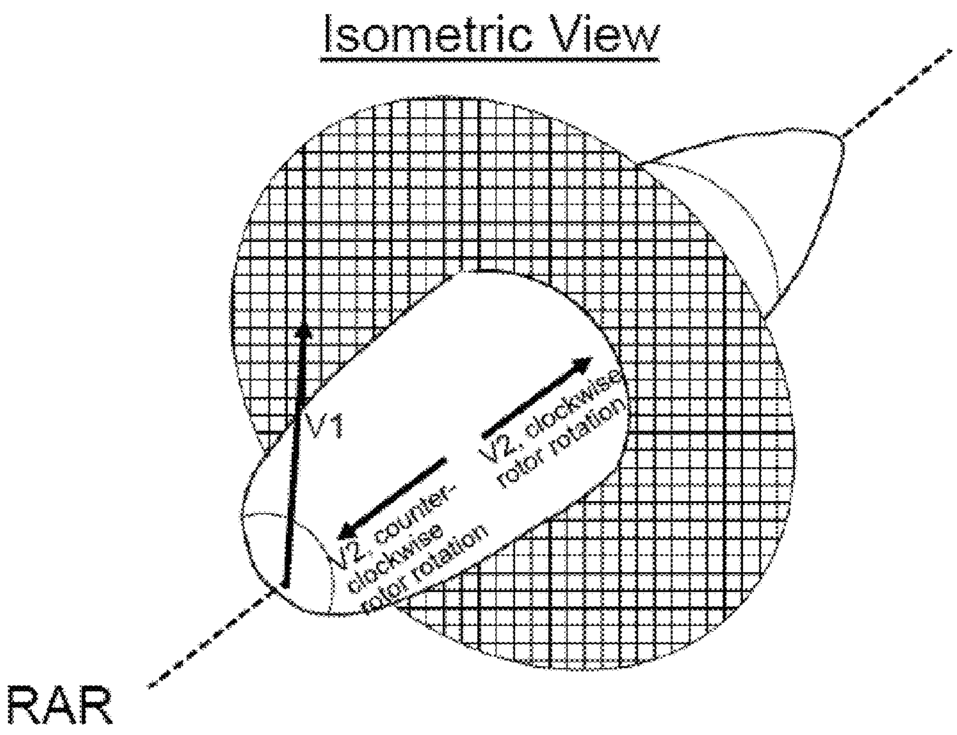
FIG. 23 is a schematic perspective view of the open fan engine with the rotor disk area added for reference and showing a vector V1 with an upward component and a right-to-left forward-looking-aft flow component and showing the directions of a vector V2 for clockwise rotation and counter-clockwise rotation.
Figure 24:
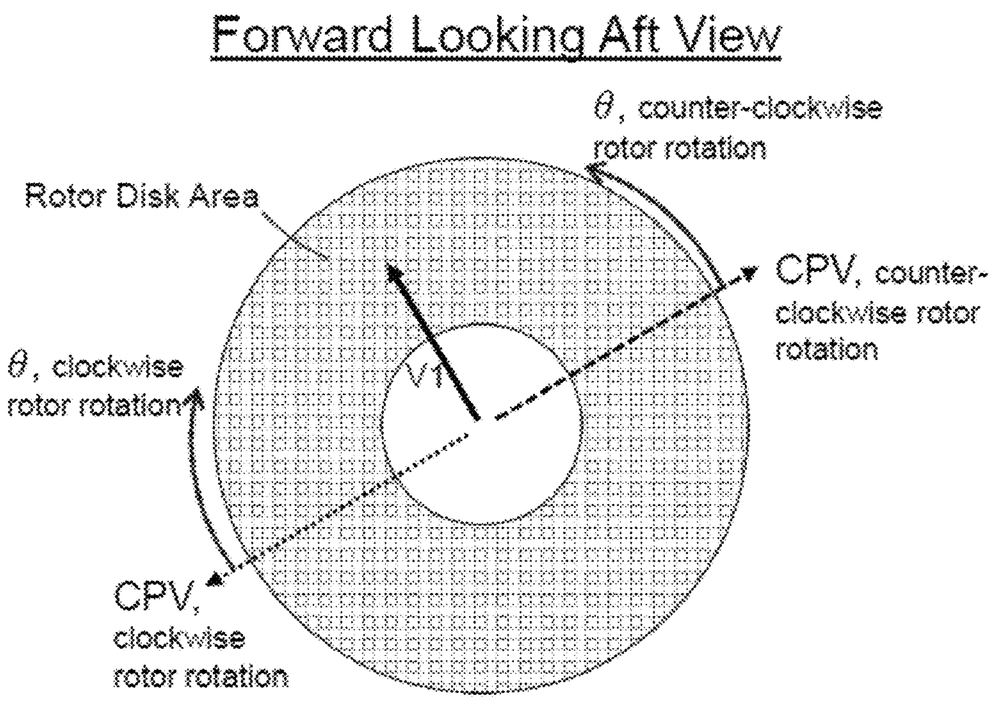
FIG. 24 is a forward-looking-aft view of the open fan engine of FIG. 23.

V1 is a vector of unit magnitude and represents the average flow direction integrated over the disk area of the intended rotor location relative to the aircraft but without the effects of the engine on the flow. For example, as shown in FIG. 18, there can be a variation in flow direction and magnitude across the rotor disk area due to aircraft angle of attack, sideslip, and/or upwash due to lifting bodies, which when integrated across the disk area results in a single vector V1. V2 is aligned with the rotor axis of rotation RAR of the open fan engine and is of unit magnitude, where the direction depends on the rotation direction of the rotor. For clockwise forward looking aft (FLA) rotor rotation, V2 extends from forward to aft along the rotor axis of rotation RAR. For counter-clockwise FLA rotor rotation, V2 extends from aft to forward along the rotor axis of rotation RAR. For example, if there were an upward vertical flow component with no horizontal flow component, as shown in FIGS. 19 and 20, then the CPV would be located along the horizontal pointed towards the left FLA for clockwise FLA rotor rotation and toward the right FLA for counter-clockwise FLA rotor rotation, respectively. In the case where there is no vertical flow component and a horizontal flow component in a direction from left to right FLA, the CPV would be located along the vertical pointed towards the top for clockwise FLA rotor rotation and towards the bottom for counter-clockwise FLA rotor rotation, as shown in FIGS. 21 and 22. In a case where there is an upward vertical flow component and a horizontal flow component in a direction of right to left FLA, the CPV would point from the rotor axis of rotation RAR towards the lower left quadrant FLA for clockwise rotor rotation FLA and would point from the rotor axis of rotation RAR towards the upper right quadrant FLA for counter-clockwise rotor rotation FLA, as shown in FIGS. 23 and 24.

Figure 27:
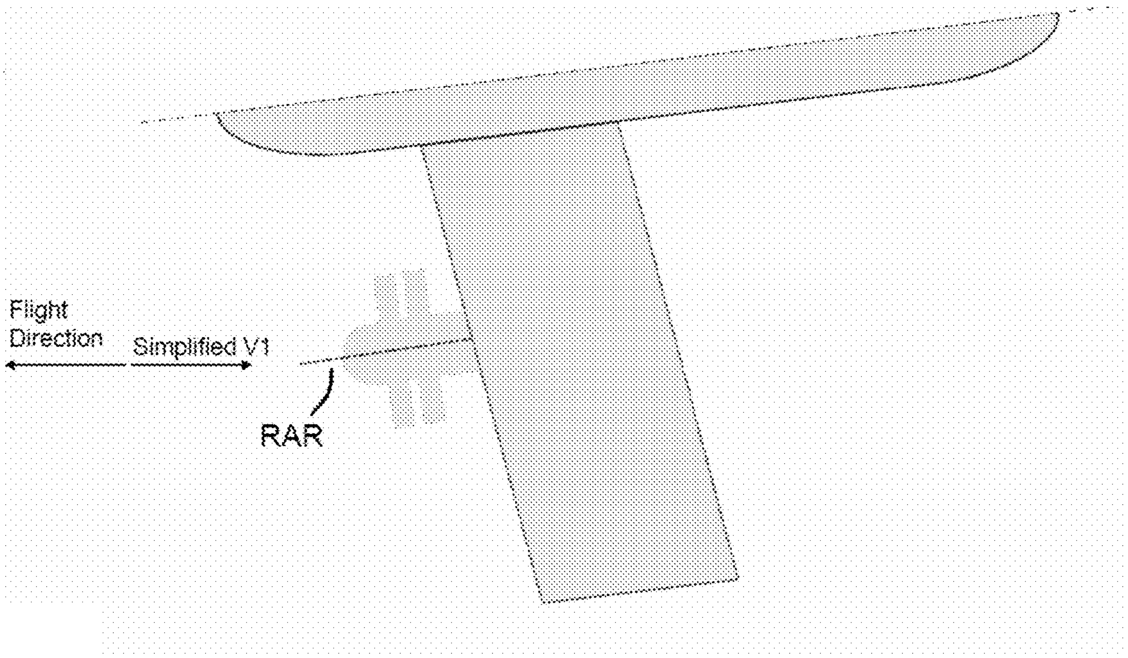
FIG. 27 is a schematic, partial top plan view of an aircraft having a wing with an exemplary open fan engine mounted relative thereto, and showing a top view of a vector V1 that is simplified to be a vector of unit magnitude aligned to the flight direction and extending from upstream to downstream.
Figure 28:
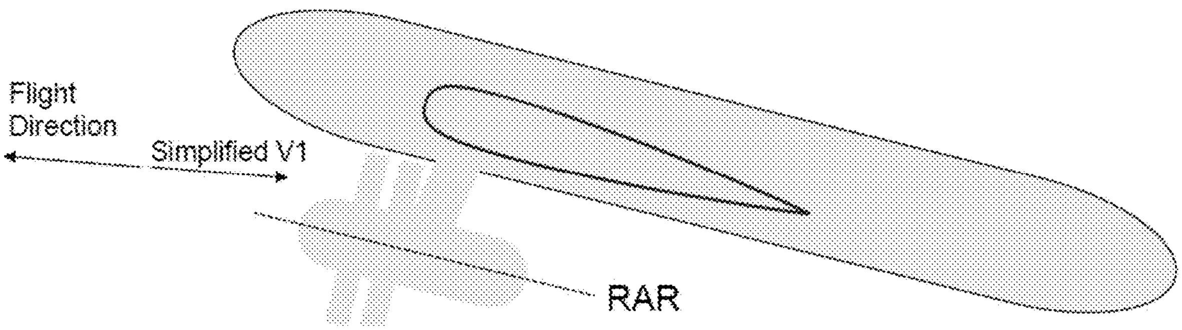
FIG. 28 is a schematic side elevation view of the aircraft of FIG. 27, showing a side view of the simplified vector V1 of FIG. 27.

As mentioned above, in one aspect, V1 can be a vector of unit magnitude aligned to the flight direction extending from upstream to downstream. This represents a simplified vector where only the orientation of the engine relative to the flight direction of the aircraft is considered; the wing upwash and other flow effects from the installation are omitted. An example of this simplified V1 can be seen in FIGS. 27 and 28, where FIG. 27 shows a top view of the aircraft and FIG. 28 shows a side elevation view of the aircraft. Based on the flight direction of the aircraft, the simplified V1 vector can be determined, which as shown has an upward and sideslip component relative to the rotor axis of rotation RAR, which in this example coincides with the axial centerline of the engine.

In certain flight conditions, there can be a large vertical flow velocity component. For example, during takeoff there can be a vertical flow velocity component that is much larger than a sideslip component. As an alternative to using CPV based upon V1 and V2, CPV could be defined as a line that extends from the rotor axis of rotation (RAR) horizontally to the left when forward looking aft (FLA) for clockwise rotor rotation FLA and continuing in the direction of rotation and starting from a line that extends from the RAR horizontally to the right when FLA for counter-clockwise rotation FLA and continuing in the direction of rotation. Advantageously, using such an alternative can allow for design of the vane assembly considering a possible critical flight condition.

For clockwise rotation of the rotor 12, the vanes 22 of the vane assembly 20 can have a variation in leading edge angle (LEA) relative to the average leading edge angle (ALEA), as shown in FIGS. 3-8. For example, the vane of FIG. 4 has a leading edge angle (LEA) that is the same as the average leading edge angle (ALEA). The vane of FIG. 5 has a leading edge angle (LEA) that is less than the average leading edge angle (ALEA), with the difference achieved by changing the stagger of the vane relative to that of FIG. 4. The vane of FIG. 6 also has a leading edge angle (LEA) that is less than the average leading edge angle (ALEA), but with the difference achieved by changing the camber of the vane relative to that of FIG. 4. The vane of FIG. 7 has a leading edge angle (LEA) that is greater than the average leading edge angle (ALEA), with the difference achieved by changing the stagger of the vane relative to that of FIG. 4. The vane of FIG. 8 also has a leading edge angle (LEA) that is greater than the average leading edge angle (ALEA), but with the difference achieved by changing the camber of the vane relative to that of FIG. 4. Also by way of example, the leading edge angles (LEA) can vary around the circumference by both stagger variation and camber variation as may be suitable improved performance for a given design.

The stagger can be changed, for example, using a vane actuator system. The vane actuator system can adjust some or all of the vanes together or on a more individual basis. Examples of vane actuator systems are disclosed in U.S. Pat. Nos. 9,103,228 and 10,704,411, which are incorporated herein by reference in their entireties.

Figure 26:
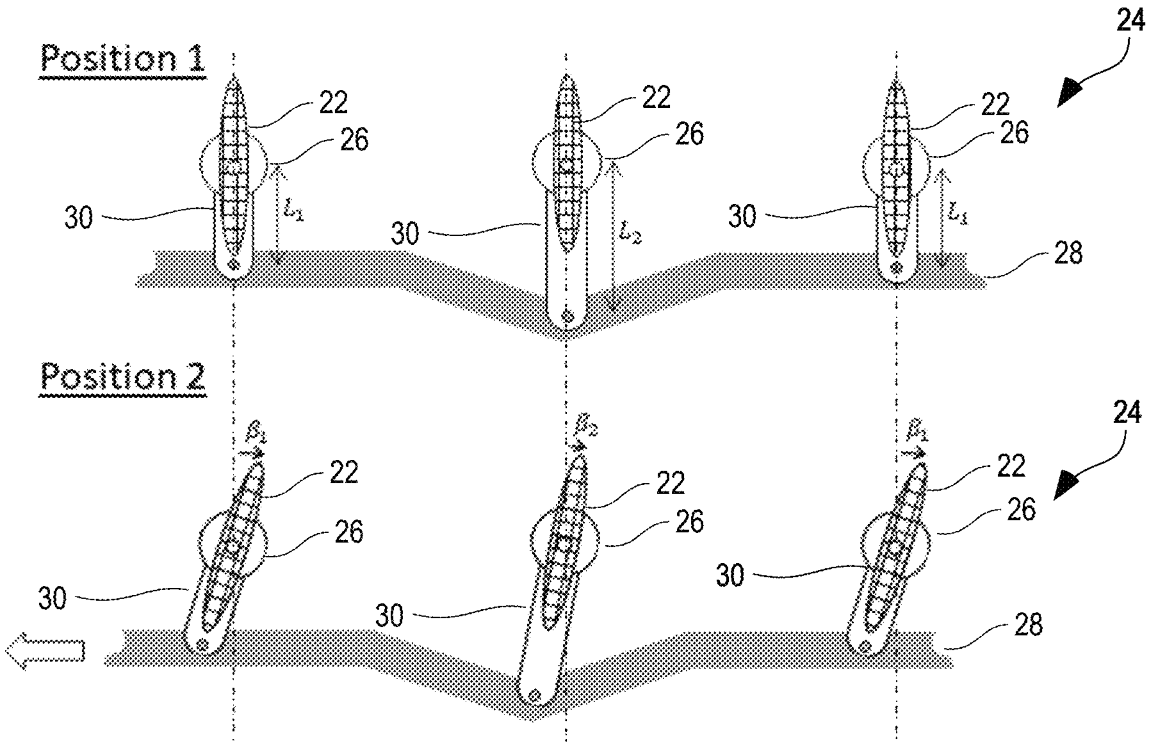
FIG. 26 is a schematic roll-out view of an exemplary vane actuator system with trunnion arms of differing lengths.

Another example of a vane actuator system 24 is depicted in FIG. 26, which shows a roll-out view of several of the vanes 22, it being understood that additional vanes or groups of vanes could be incorporated into the system or multiple such systems being included for groups of vanes of a common rotor. The vane actuator system 24 includes a vane trunnion 26 for each of the vanes 22 which can rotate about a central axis, which can be a line that extends from the engine axial centerline to the center of the vane trunnion 26. The vane trunnion 26 is connected to the vane 22 and thus controls the vane stagger as the vane trunnion 26 rotates. The rotation of the vane trunnion 26 is controlled by a kinematic linkage 28. The kinematic linkage 28 rotates about the engine axial centerline, and is controlled by one or more actuators. For a given rotation of the kinematic linkage 28 (or shift to the left or right as shown in the roll-out view of FIG. 26), the vane trunnion 26, and thus the vane 22, rotates some amount ß based on the length L of a trunnion arm 30 extending between the vane trunnion 26 and the kinematic linkage 28. The trunnion arm 30 is pivotable at one end portion relative to the vane trunnion 26 and at another end portion relative to the kinematic linkage 28. The trunnion arms 30 can optionally vary in length. By varying the lengths L of the trunnion arms 30, the change in ß can be varied among the vanes 22 in the vane assembly 20. FIG. 26 shows two different positions, Position 1 and Position 2. Position 1 is some starting position. Position 2 shows the vane stagger having been changed as compared to Position 1. The kinematic linkage 28 has rotated about the engine axial centerline (shifted to the left in the roll-out view), the difference in β based on the variation in length L of the trunnion arms 30. In FIG. 26, $L_2$ is greater than $L_1$, and $\beta_2$ is less than $\beta_1$. The use of such a vane actuator system 24 can beneficially allow for changing the amount of circumferential variation in stagger or LE angle throughout the flight envelope.

For counter-clockwise rotation of the rotor 12, the vanes 22 of the vane assembly 20 can have a variation in leading edge angle (LEA) relative to the average leading edge angle (ALEA), as shown in FIGS. 9-14. For example, the vane of FIG. 10 has a leading edge angle (LEA) that is the same as the average leading edge angle (ALEA). The vane of FIG. 11 has a leading edge angle (LEA) that is less than the average leading edge angle (ALEA), with the difference achieved by changing the stagger of the vane relative to that of FIG. 10. The vane of FIG. 12 also has a leading edge angle (LEA) that is less than the average leading edge angle (ALEA), but with the difference achieved by changing the camber of the vane relative to that of FIG. 10. The vane of FIG. 13 has a leading edge angle (LEA) that is greater than the average leading edge angle (ALEA), with the difference achieved by changing the stagger of the vane relative to that of FIG. 10. The vane of FIG. 14 also has a leading edge angle (LEA) that is greater than the average leading edge angle (ALEA), but with the difference achieved by changing the camber of the vane relative to that of FIG. 10. As mentioned above, the leading edge angles (LEA) can vary around the circumference by both stagger variation and camber variation as may be suitable improved performance for a given design.

There are certain circumferential locations where it can be beneficial to have a greater delta in leading edge angle (DLEA) for a vane as compared to a vane in a different circumferential location. For example, there could be an installed configuration where there is a large upwards vertical velocity component acting on the engine due to airplane angle of attack and wing upwash. A vane at 0° Θ could see a larger circumferential velocity and thus swirl into the vane due to this engine-level effect. For this same condition a vane at 90° Θ may see little change in circumferential velocity and thus swirl since it is in plane with the engine vertical velocity component. To align these vanes with the upstream flow and improve performance, the vane at 0° Θ can have a larger leading edge angle (LEA) as compared to the vane at 90° Θ. Moreover, the delta in leading edge angle (DLEA) can be either zero, positive, representing an increase in leading edge angle (LEA) as compared to the average leading edge angle (DLEA), or negative, representing a decrease in leading edge angle (LEA) as compared to the average leading edge angle (DLEA).

After establishing the circumferential variation in DLEA, it may be further advantageous to change the ALEA in response to the flow angularity ("FA") averaged over the rotor disk area. The FA can be obtained using the inverse cosine of the dot product of vectors V1 and V2. Specifically, $FA=\cos^{-1}(V1\cdot V2)$ when the propeller is rotating clockwise when viewed FLA; and $FA=180°-\cos^{-1}(V1\cdot V2)$ when the propeller is rotating counter-clockwise when viewed FLA. When FA is high, e.g., greater than 10 degrees, it may be beneficial to increase the ALEA.

This functionality may optionally be built into an engine control system, e.g., a full authority digital engine control (FADEC), wherein this system receives an assessment of FA from the aircraft. Such an assessment of FA could come from multiple aircraft-sensed parameters that enable a calculation or estimate of V1. For example, the aircraft could use the aircraft pitch, trajectory, sideslip, maneuver data, and wing upwash, among other variables, to compute a value for V1. Alternatively, the aircraft could provide individual inputs to the engine control system which determines the value of V1. Whether V1 is provided by the aircraft or computed by the engine control system, the engine control system may use such input to command the vane actuator or actuators to increase ALEA with or without changing DLEA for the vanes individually.

The inventors have sought to maximize efficiency of unducted open fan engines during in-flight propulsion of an aircraft. In particular, the inventors were focused on how the air flow past an unducted open fan engine can be improved. The inventors, in consideration of many different variables associated with an unducted open fan engine, considered how the vanes can be improved particularly given the different flight conditions, e.g., take-off and cruise. As described above, the inventors unexpectedly determined that varying the leading edge angles of the vanes depending upon the circumferential location of the vanes about the engine can provide benefits. More specifically, the circumferential variation in leading edge angle (LEA) could provide aircraft system benefits such as maintaining thrust at takeoff, reduced fuel burn over the mission, reduced aeromechanics risk, and/or reduced noise generation.

Figure 15:
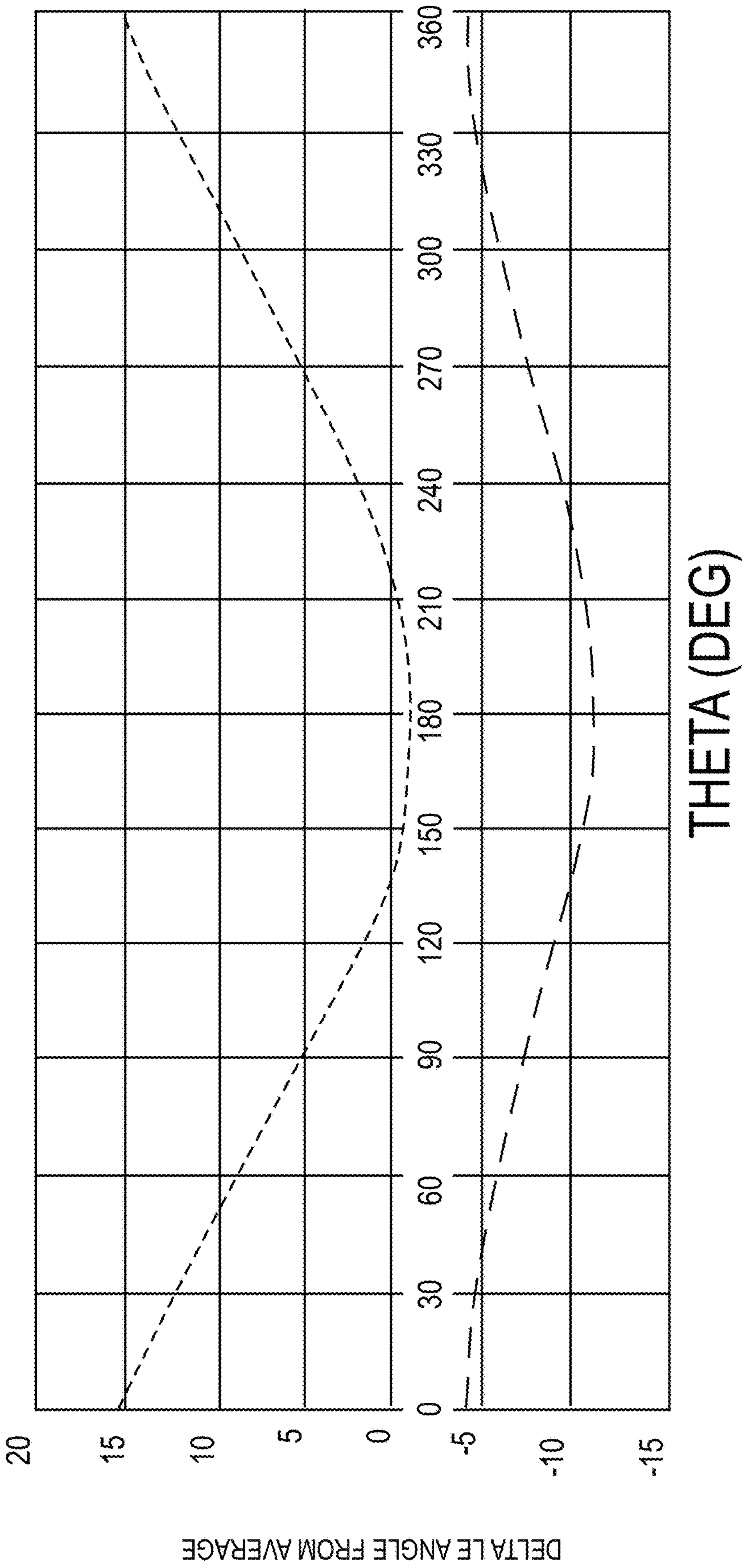
FIG. 15 is a graph showing a first band of suitable ranges of the leading edge angle of a vane for a given θ.

As shown in FIG. 15, the delta in leading angle (DLEA) for a span along the length of the vane 22 from an average leading edge angle (ALEA) at that span for each of the plurality of vanes 22 can be disposed between an upper curve defined by the expression $$9^{*}\cos\left(0.8^{*}\theta+\frac{\pi}{5}\right)+7.9$$

and a lower curve defined by the expression 3.5*cos(θ)–7.5.

Figure 16:
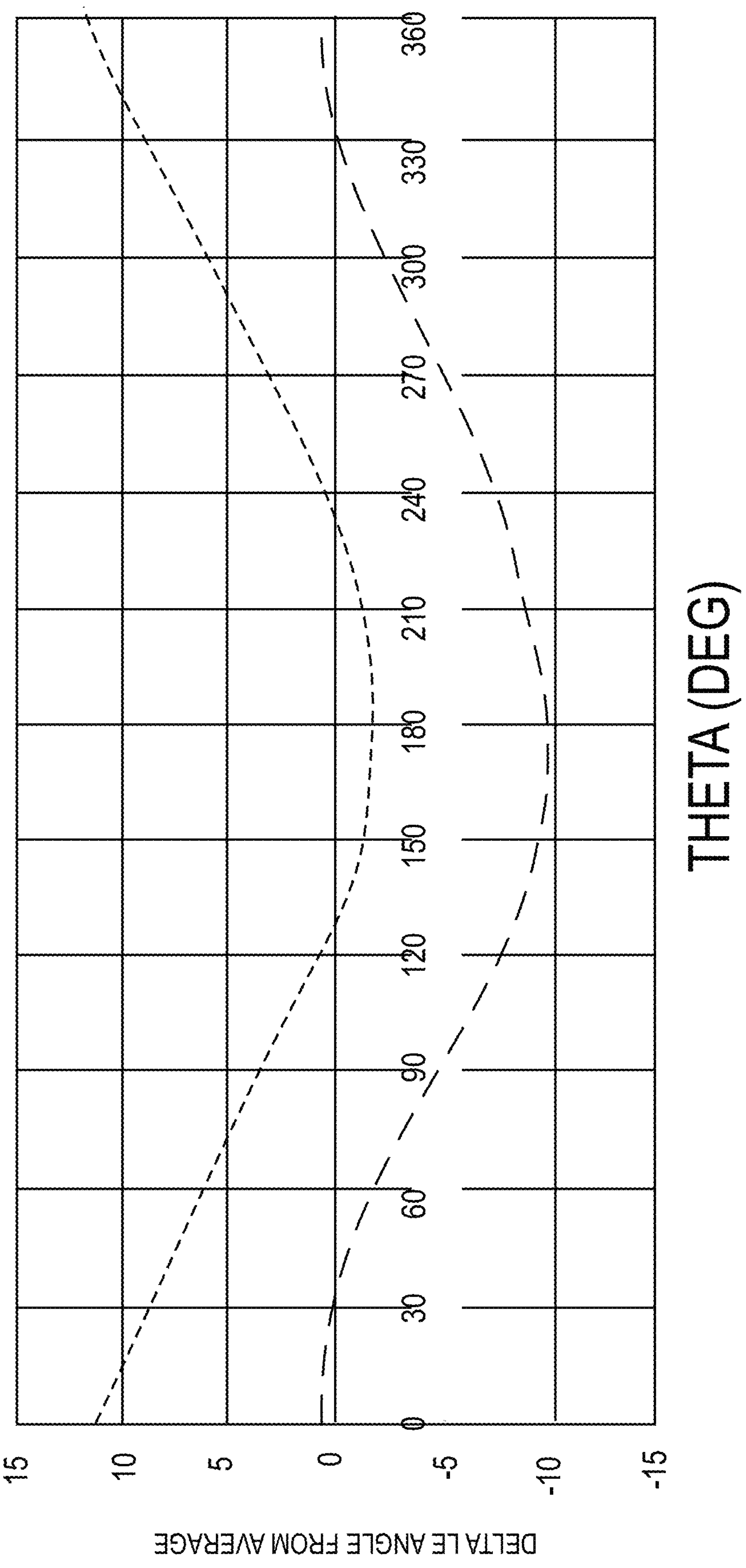
FIG. 16 is a graph showing a second band of suitable ranges of the leading edge angle of a vane for a given θ, the second band being different than the first band of FIG. 15.

As shown in FIG. 16, the delta in leading angle (DLEA) for a span along the length of the vane 22 from an average leading edge angle (ALEA) at that span for each of the plurality of vanes 22 can be disposed between a curve between an upper curve defined by the expression $$7^{*}\cos\left(0.8^{*}\theta+\frac{\pi}{5}\right)+5.5$$

and a lower curve defined by the expression 5.5*cos(θ)–4.5.

In any of the foregoing examples or embodiments, the unducted fan propulsor 10, incorporating the vane assembly described herein, can have a cruise flight Mach Mo of between 0.5 and 0.9, between 0.7 and 0.9, or between 0.75 and 0.9. The unducted fan propulsor 10 can be part of a winged aircraft, such as an airplane.

Expressing thrust non-dimensionally in a way that accounts for flight speed, ambient conditions, and fan annular area yields a thrust parameter as follows:

$$\frac{F_{net}}{\rho_0 V_0^2 A_{an}},$$

where $F_{net}$ is cruise fan net thrust, $\rho_0$ is ambient air density, $V_0$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan. A propulsor that operates at a high cruise fan net thrust parameter (e.g., greater than 0.06) tends to have high velocities with risk of high drag on the vanes.

Also in any of the foregoing examples or embodiments, there may be a particularly beneficial range of a dimensionless cruise fan net thrust parameter normalized by ambient density, cruise flight speed squared, and fan stream tube annular area at fan inlet that can be defined by the following expression:

$$0.15>\frac{F_{net}}{\rho_0 A_{an} V_0^2}>0.06$$

A propulsor that operates at a high cruise flight Mach number (e.g., greater than 0.7) encounters velocities near the surfaces of the rotor, vanes, and nacelle that approach the speed of sound, or Mach 1.0. At such conditions, drag increases sharply with Mach number. In general, friction drag increases roughly in proportion to the square of the air velocity. However, as the Mach number increases, a larger contributor to the increase in drag comes from wave drag. Wave drag is a drag resulting from shock waves that form as the flow of air near a surface becomes supersonic (e.g., Mach>1.0). In addition to the cruise flight Mach number, another factor contributing to increased drag on a propulsor is high non-dimensional cruise fan net thrust based on fan annular area and flight speed. The same acceleration of the air stream by the fan that produces thrust also tends to increase the drag force on the rotor, vanes, and nacelle.

Both a high cruise flight Mach and high dimensionless cruise fan net thrust parameter contribute to high drag levels on the vanes. Advantageously, varying the leading edge angles of the vanes depending on the circumferential location can counter the high drag levels on the vanes when there is a high cruise flight Mach and/or a high dimensionless cruise fan net thrust parameter.

Determining the flow angularity (FA) at a rotor disk area of the open fan engine on an aircraft having at least one wing can include, as mentioned above, calculating a value for the FA using some combination of the aircraft pitch, trajectory, sideslip, maneuver data, and position and orientation of the rotor disk area relative to the wing, wherein FA $\cos^{-1}(\mathbf{V1}\cdot\mathbf{V2})$ when the rotor is rotating clockwise forward-looking-aft (FLA) and FA=180°$-\cos^{-1}(\mathbf{V1}\cdot\mathbf{V2})$ when the rotor is rotating counter-clockwise FLA. The FA could be a simplified approximation using one of those variables, such as aircraft pitch. The FA could also use at least those variables, in addition to others.

Determining the FA can be useful for adjusting the ALEA of the vanes by changing the stagger of the vanes of the open fan engine. The stagger can be changed based upon operating conditions, e.g., cruise as opposed to take-off. For example, the stagger of the vanes can be changed to reduce flow separation on the vanes when FA>5° or, more preferably, when FA>10°. Reducing flow separation on the vanes can provide further system benefits and efficiency, such as maintaining thrust at takeoff, reduced fuel burn over the mission, reduced aeromechanics risk, and/or reduced noise generation.

Also by way of example, the stagger of the vanes can be changed from a first or initial ALEA ($ALEA_1$) where FA=0 to a second, different ALEA ($ALEA_2$) where FA>0. The change or delta in ALEA ($DALEA=ALEA_2-ALEA_1$) can be determined using one of the following equations:

$$0.15(FA-5\text{deg})<=\text{DALEA}<=(FA-5\text{deg}) \quad \text{Equation (1)}$$

$$0.25(FA-5\text{ deg})<=\text{DALEA}<=0.7(FA-5\text{deg}). \quad \text{Equation (2)}$$

Figure 25:
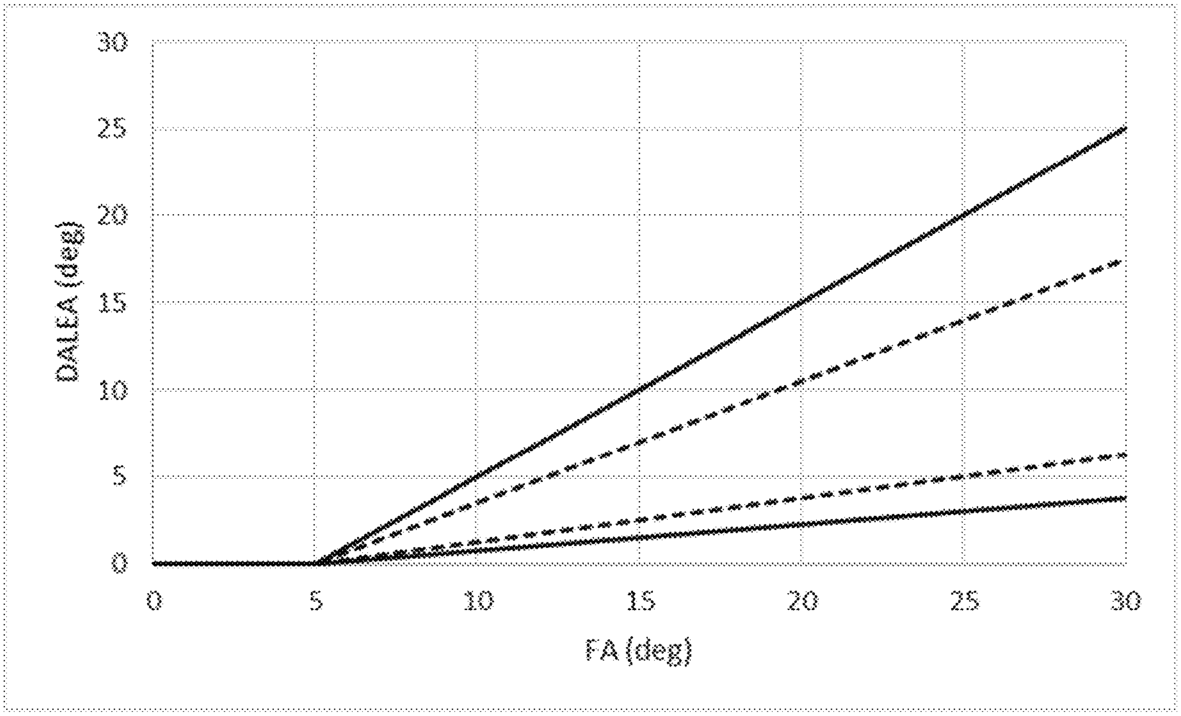
FIG. 25 is a graph showing a delta in ALEA (DALEA=$ALEA_2-ALEA_1$) as compared to flow angularity (FA) for an exemplary arrangement.

These relationships between the DALEA and the FA are depicted in the graph of FIG. 25, wherein Equation (1) is depicted between the solid lines in FIG. 25 and Equation (2) is depicted between the dashed lines in FIG. 25.

As shown in FIG. 25, DALEA preferably falls between the boundary for a given FA. This depicts a desired DALEA that can result in a beneficial change in ALEA from the first or initial ALEA to second, different ALEA to reduce flow separation at the vanes. For example, flow separation at the vanes may increase with FA. To reduce flow separation at such an increased FA, an increase to ALEA can be made, such as by using the vane actuator system. The amount of increase to ALEA can be dependent upon the value of FA. As shown in FIG. 25, as the FA increases, the amount of increase to ALEA can likewise increase. Such a dynamic system can respond to the level of FA, and the amount of DLEA is dependent upon FA.

Further aspects of the disclosure are provided by the subject matter of the following clauses:

A vane assembly is provided for use with an open fan engine having a rotor with an axis of rotation and a stator, the vane assembly comprising a plurality of vanes, each arranged about the stator at a different circumferential location θ, where θ is measured relative to a circumferential positioning vector (CPV) defined as the cross-product of V1 and V2 (V1×V2), and θ increases in the direction of rotor rotation, each of the plurality of vanes having a chord (C), and a leading edge (LE), leading edge angle (LEA) and a mean camber line (MCL) at a span of the vane, a delta in leading angle (DLEA) from an average leading edge angle (ALEA) at that span for each of the plurality of vanes being between:

$$9^*\cos\left(0.8^*\theta+\frac{\pi}{5}\right)+7.9$$

and $$3.5^*\cos(\theta)-7.5$$

wherein a first reference line (R1) at the span of the vane has a starting point (SP) at the LE and on the mean camber line (MCL) and an end point (EP) on the MCL at between 2% and 15% of the C measured from the LE; wherein a second reference line (R2) extends forward from the EP of the R1 in a direction toward the LE and parallel to the axis of rotation; and wherein the LEA is measured from the R2 to the R1 in the direction of rotor rotation.

The vane assembly of any preceding clause, wherein the ending point (EP) of the first reference line (R1) of the vanes of the plurality of vanes is located at between 2% and 10% of the chord (C).

The vane assembly of any preceding clause, wherein the ending point (EP) of the first reference line (R1) of the vanes of the plurality of vanes is located at between 2% and 5% of the chord (C).

The vane assembly of any preceding clause, wherein the ending point (EP) of the first reference line (R1) of the vanes of the plurality of vanes is located at between 2% and 3% of the chord (C).

The vane assembly of any preceding clause, wherein the ending point (EP) of the first reference line (R1) of the vanes of the plurality of vanes is located at 2% of the chord (C).

The vane assembly of any preceding clause, wherein the delta in leading edge angle (DLEA) for each of the vanes of the plurality of vanes is between:

$$7^*\cos\left(0.8^*\theta+\frac{\pi}{5}\right)+5.5$$

and $$5.5^*\cos(\theta)-4.5.$$

The vane assembly of any preceding clause, wherein the ending point (EP) of the first reference line (R1) of the vanes of the plurality of vanes is located at between 2% and 10% of the chord (C).

The vane assembly of any preceding clause, wherein the ending point (EP) of the first reference line (R1) of the vanes of the plurality of vanes is located at between 2% and 5% of the chord (C).

The vane assembly of any preceding clause, wherein the ending point (EP) of the first reference line (R1) of the vanes of the plurality of vanes is located at between 2% and 3% of the chord (C).

The vane assembly of any preceding clause, wherein the ending point (EP) of the first reference line (R1) of the vanes of the plurality of vanes is located at 2% of the chord (C).

The vane assembly of any preceding clause, wherein the plurality of vanes includes between 8 and 16 vanes.

The vane assembly of any preceding clause, wherein the plurality of vanes includes: a vane or vanes with a maximum leading edge angle (MAXLEA), and a vane or vanes with a minimum leading edge angle (MINLEA), wherein a difference between MAXLEA and MINLEA is greater than 2 degrees.

The vane assembly of any preceding clause, wherein the difference between MAXLEA and MINLEA is greater than 3 degrees.

The vane assembly of any preceding clause, wherein the difference between MAXLEA and MINLEA is greater than 5 degrees.

The vane assembly of any preceding clause, wherein a difference in the leading edge angle (LEA) compared to the average leading edge angle (ALEA) for a given one of the plurality of vanes is due to a difference in stagger and/or camber of the given one of the plurality of vanes compared to one or more others of the plurality of vanes.

The vane assembly of any preceding clause, wherein a difference in the leading edge angle (LEA) compared to the average leading edge angle (ALEA) for a given one of the plurality of vanes is due to a difference in camber of the given one of the plurality of vanes compared to one or more others of the plurality of vanes.

The vane assembly of any preceding clause, wherein a difference in the leading edge angle (LEA) compared to the average leading edge angle (ALEA) for a given one of the plurality of vanes is due to a difference in stagger of the given one of the plurality of vanes compared to one or more others of the plurality of vanes.

An open fan engine is provided that has a rotor with an axis of rotation and a stator, the rotor having a plurality of blades disposed about a periphery thereof and the stator comprising the vane assembly of any of the preceding clauses.

An aircraft is provided having the open fan engine of the preceding clause, wherein the open fan engine has a cruise Mach Mo of between 0.5 and 0.9, preferably between 0.7 and 0.9, and more preferably between 0.75 and 0.9.

An aircraft is provided having the open fan engine of any of the preceding two clauses, wherein the open fan engine has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, Po is ambient air density, $V_o$ is cruise flight velocity, and $A_{an}$ is annular cross-sectional area perpendicular to an axis of rotation of a rotor axis of rotation RAR.

The vane assembly of any preceding clause, wherein the DLEA of at least 50% of the vanes is between:

$$9^*\cos\left(0.8^*\theta + \frac{\pi}{5}\right) + 7.9$$

and $$3.5^*\cos(\theta) - 7.5.$$

A method is provided of reducing flow separation on the vanes of the vane assembly of the open fan engine of any of the preceding claims, the open fan engine being in combination with an aircraft having at least one wing, the method including: determining the flow angularity (FA) by combining two or more of aircraft pitch, trajectory, sideslip, maneuver data, position and orientation of the rotor disk area relative to the wing, and wing circulation, wherein FA=$\cos^{-1}$(V1·V2) when the rotor is rotating clockwise forward-looking-aft (FLA) and FA=180°−$\cos^{-1}$(V1·V2) when the rotor is rotating counter-clockwise FLA; and increasing the ALEA of the vanes of the vane assembly by changing the stagger of the vanes as a function of the FA.

A method is provided of reducing flow separation on the vanes of the vane assembly of the open fan engine of any of the preceding claims, the open fan engine being in combination with an aircraft having at least one wing, the method including: determining the flow angularity (FA) by combining two or more of aircraft pitch, trajectory, sideslip, maneuver data, and position and orientation of the rotor disk area relative to the wing, wherein FA=$\cos^{-1}$(V1·V2) when the rotor is rotating clockwise forward-looking-aft (FLA) and FA=180°−$\cos^{-1}$(V1·V2) when the rotor is rotating counter-clockwise FLA; and changing the ALEA of the vanes by changing the stagger of the vanes to reduce flow separation on the vanes when FA>5°.

Any of the preceding methods may further include changing the ALEA of the vanes by changing the stagger of the vanes to reduce flow separation on the vanes when FA>10°.

Any of the preceding methods may further include changing the ALEA of the vanes by changing the stagger of the vanes from a first ALEA ($ALEA_1$) where FA=0 to a second ($ALEA_2$) where FA>5, where the delta in ALEA (DALEA) between $ALEA_2$ and $ALEA_1$ is greater than or equal to 0.15 (FA−5°) and less than or equal to (FA−5°).

Any of the preceding methods may further include the ALEA of the vanes by changing the stagger of the vanes from a first ALEA ($ALEA_1$) where FA=0 to a second ($ALEA_2$) where FA>5, where the delta in ALEA (DALEA) between $ALEA_2$ and $ALEA_1$ is greater than or equal to 0.25*(FA −5°) and less than or equal to 0.7*(FA −5°).

The vane assembly of any preceding clause, wherein the distribution of DLEA as compared to θ is adjustable.

The vane assembly of any preceding clause, wherein the difference between MAXLEA and MINLEA increases with increasing ALEA.

The vane assembly of any preceding clause, further including a vane actuator system, each of the vanes being mounted to a rotatable trunnion, each of the rotatable trunnions being rotatable via a linkage arm extending between the trunnion and a kinematic linkage, wherein the change in MAXLEA and MINLEA as ALEA varies is achieved by using multiple linkage lengths between the vane trunnion and kinematic system.

The vane assembly of any preceding clause, wherein V1 is a vector of unit magnitude aligned to the flight direction extending from upstream to downstream.

The vane assembly of any preceding clause, wherein V1 is a vector of unit magnitude and represents the average flow direction integrated over the disk area of the intended rotor location as it would be positioned on an aircraft.

A vane assembly is provided for use with an open fan engine having a rotor with a rotor axis of rotation (RAR) and a stator, the vane assembly comprising a plurality of vanes, each arranged about the stator at a different circumferential location θ, where θ is measured relating to a circumferential positioning vector (CPV) defined as a line that extends from the RAR horizontally to the left when forward looking aft (FLA) for clockwise rotor rotation FLA and continuing in the direction of rotation and starting from a line that extends from the RAR horizontally to the right when FLA for counter-clockwise rotation FLA and continuing in the direction of rotation, each of the plurality of vanes having a chord (C), and a leading edge (LE), leading edge angle (LEA) and a mean camber line (MCL) at a span of the vane, a delta in leading angle (DLEA) from an average leading edge angle (ALEA) at that span for each of the plurality of vanes being between:

$$9^{*}\cos\left(0.8^{*}\theta+\frac{\pi}{5}\right)+7.9$$

and $$3.5^{*}\cos(\theta)-7.5$$

wherein a first reference line (R1) at the span of the vane has a starting point (SP) at the LE and on the mean camber line (MCL) and an end point (EP) on the MCL at between 2% and 15% of the C measured from the LE; wherein a second reference line (R2) extends forward from the EP of the R1 in a direction toward the LE and parallel to the axis of rotation; and wherein the LEA is measured from the R2 to the R1 in the direction of rotor rotation. This clause may be combined with any of the preceding clauses.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the disclosure concept.

What is claimed is:

1. A vane assembly for an open fan engine having a rotor with an axis of rotation and a stator, the vane assembly comprising a plurality of vanes, each arranged about the stator at a different circumferential location θ, where θ is measured relative to a circumferential positioning vector (CPV) defined as the cross-product of V1 and V2 (V1×V2), and θ increases in the direction of rotor rotation, each of the plurality of vanes having a chord (C), and a leading edge (LE), leading edge angle (LEA) and a mean camber line (MCL) at a span of the vane, a delta in leading angle (DLEA) from an average leading edge angle (ALEA) at that span for each of the plurality of vanes being between:

$$9^{*}\cos\left(0.8^{*}\theta+\frac{\pi}{5}\right)+7.9$$

and $$3.5^{*}\cos(\theta)-7.5$$

wherein a first reference line (R1) at the span of the vane has a starting point (SP) at the LE and on the mean camber line (MCL) and an end point (EP) on the MCL at between 2% and 15% of the C measured from the LE;

wherein a second reference line (R2) extends forward from the EP of the R1 in a direction toward the LE and parallel to the axis of rotation; and wherein the LEA is measured from the R2 to the R1 in the direction of rotor rotation.

2. The vane assembly of claim 1, wherein the ending point (EP) of the first reference line (R1) of the vanes of the plurality of vanes is located at between 2% and 10% of the chord (C).

3. The vane assembly of claim 1, wherein the ending point (EP) of the first reference line (R1) of the vanes of the plurality of vanes is located at between 2% and 5% of the chord (C).

4. The vane assembly of claim 1, wherein the ending point (EP) of the first reference line (R1) of the vanes of the plurality of vanes is located at between 2% and 3% of the chord (C).

5. The vane assembly of claim 1, wherein the delta in leading edge angle (DLEA) for each of the vanes of the plurality of vanes is between:

$$7^{*}\cos\left(0.8^{*}\theta+\frac{\pi}{5}\right)+5.5$$

and $$5.5^{*}\cos(\theta)-4.5.$$

6. The vane assembly of claim 1, wherein the plurality of vanes comprises between 8 and 16 vanes.

7. The vane assembly of claim 1, wherein the plurality of vanes comprises:

a vane or vanes with a maximum leading edge angle (MAXLEA), and a vane or vanes with a minimum leading edge angle (MINLEA), wherein a difference between MAXLEA and MINLEA is greater than 2 degrees.

8. The vane assembly of claim 7, wherein the difference between MAXLEA and MINLEA is greater than 3 degrees.

9. The vane assembly of claim 8, wherein the difference between MAXLEA and MINLEA is greater than 5 degrees.

10. The vane assembly of claim 1, wherein a difference in the leading edge angle (LEA) compared to the average leading edge angle (ALEA) for a given one of the plurality of vanes is due to a difference in stagger and/or camber of the given one of the plurality of vanes compared to one or more others of the plurality of vanes.

11. An open fan engine having a rotor with an axis of rotation and a stator, the rotor having a plurality of blades disposed about a periphery thereof and the stator comprising the vane assembly of claim 1.

12. An aircraft having the open fan engine of claim 11, wherein the open fan engine has a cruise Mach Mo of between 0.5 and 0.9.

13. An aircraft having the open fan engine of claim 11, wherein the open fan engine has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation RAR.

14. An aircraft having the open fan engine of claim 11, wherein the open fan engine has a cruise Mach Mo of between 0.7 and 0.9.

15. An aircraft having the open fan engine of claim 11, wherein the open fan engine has a cruise Mach Mo of between 0.75 and 0.9.

16. The vane assembly of claim 1, wherein the DLEA of at least 50% of the vanes is between:

$$9^{*}\cos\left(0.8^{*}\theta+\frac{\pi}{5}\right)+7.9$$

and $$3.5^{*}\cos(\theta)-7.5.$$

17. The vane assembly of claim 1, wherein the distribution of DLEA as compared to θ is adjustable.

18. The vane assembly of claim 17, wherein the difference between MAXLEA and MINLEA increases with increasing ALEA.

19. The vane assembly of claim 18, further comprising a vane actuator system, each of the vanes being mounted to a rotatable trunnion, each of the rotatable trunnions being rotatable via a linkage arm extending between the trunnion and a kinematic linkage, wherein the change in MAXLEA and MINLEA as ALEA varies is achieved by using multiple linkage lengths between the vane trunnion and kinematic system.

20. The vane assembly of claim 1, wherein V1 is a vector of unit magnitude aligned to the flight direction extending from upstream to downstream.

21. The vane assembly of claim 1, wherein V1 is a vector of unit magnitude and represents the average flow direction integrated over the disk area of the intended rotor location as it would be positioned on an aircraft.

22. A vane assembly for an open fan engine having a rotor with a rotor axis of rotation (RAR) and a stator, the vane assembly comprising a plurality of vanes, each arranged about the stator at a different circumferential location θ, where θ is measured relating to a circumferential positioning vector (CPV) defined as a line that extends from the RAR horizontally to the left when forward looking aft (FLA) for clockwise rotor rotation FLA and continuing in the direction of rotation and starting from a line that extends from the RAR horizontally to the right when FLA for counter-clockwise rotation FLA and continuing in the direction of rotation, each of the plurality of vanes having a chord (C), and a leading edge (LE), leading edge angle (LEA) and a mean camber line (MCL) at a span of the vane, a delta in leading angle (DLEA) from an average leading edge angle (ALEA) at that span for each of the plurality of vanes being between:

$$9^{*}\cos\left(0.8^{*}\theta+\frac{\pi}{5}\right)+7.9$$

and $$3.5^{*}\cos(\theta)-7.5$$

wherein a first reference line (R1) at the span of the vane has a starting point (SP) at the LE and on the mean camber line (MCL) and an end point (EP) on the MCL at between 2% and 15% of the C measured from the LE;

wherein a second reference line (R2) extends forward from the EP of the R1 in a direction toward the LE and parallel to the axis of rotation; and wherein the LEA is measured from the R2 to the R1 in the direction of rotor rotation.

* * * * *